United States Patent
Yoon et al.

(10) Patent No.: US 9,115,248 B2
(45) Date of Patent: *Aug. 25, 2015

(54) POLYLACTIDE RESIN HAVING EXCELLENT HEAT RESISTANCE AND PREPARATION METHOD THEREOF

(71) Applicant: LG CHEM, LTD., Seoul (KR)

(72) Inventors: Sung-Cheol Yoon, Daejeon (KR);
Seong-Woo Kim, Seoul (KR);
Seung-Young Park, Daejeon (KR);
In-Su Lee, Seoul (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/219,848

(22) Filed: Mar. 19, 2014

(65) Prior Publication Data

US 2014/0206834 A1    Jul. 24, 2014

Related U.S. Application Data

(62) Division of application No. 13/704,099, filed as application No. PCT/KR2011/004525 on Jun. 21, 2011, now Pat. No. 8,722,845.

(30) Foreign Application Priority Data

Jun. 21, 2010  (KR) .................. 10-2010-0058639

(51) Int. Cl.
*C08G 63/85* (2006.01)
*C08G 63/08* (2006.01)
*C08G 63/82* (2006.01)

(52) U.S. Cl.
CPC .............. *C08G 63/85* (2013.01); *C08G 63/08* (2013.01); *C08G 63/823* (2013.01)

(58) Field of Classification Search
CPC ...................................... C08G 63/85
USPC ......................................... 528/283
See application file for complete search history.

(56) References Cited

U.S. PATENT DOCUMENTS

| | | | |
|---|---|---|---|
| 5,142,023 | A | 8/1992 | Gruber et al. |
| 5,338,822 | A | 8/1994 | Gruber et al. |
| 5,770,682 | A | 6/1998 | Ohara et al. |
| 6,111,137 | A | 8/2000 | Suizu et al. |
| 6,166,169 | A | 12/2000 | Fritz et al. |
| 6,353,030 | B1 | 3/2002 | Prikoszovich |
| 2010/0130651 | A1 | 5/2010 | Fukawa et al. |

FOREIGN PATENT DOCUMENTS

| | | |
|---|---|---|
| CN | 102333785 | 1/2012 |
| CN | 102791764 | 11/2012 |
| EP | 0 469 520 | 7/1991 |
| EP | 0849252 | 6/1998 |
| EP | 2116576 | 11/2009 |
| EP | 2395009 | 12/2011 |
| JP | 09-012688 | 1/1997 |
| JP | 10-287734 | 10/1998 |
| JP | 2000-044658 | 2/2000 |
| JP | 2002-256142 | 9/2002 |
| JP | 2008-248162 A | 10/2008 |
| KR | 10-0255904 | 5/2000 |
| WO | 2008-141265 | 11/2008 |

OTHER PUBLICATIONS

Leenslag et al. Makromol. Chem. 1987, 188, 1809-1814.
Witzke et al. Macromolecules 1997, 30, 7075-7085.
Majerska et al. Macromol Rapid Commun 2000, 21, 1327-1332.
Kowalski et al. Macromolecules 2005, 38, 8170-8176.
Nijenhuis et al. Macromolecules 1992, 25, 6419-6424.
Degee et al Journal Polymer Science Part A; Polymer chemistry 1999, 37, 2413-2420.
Degee et al Macromol. Symp. 1999, 144, 289-302.
Zhang, X et al, Journal of Polymer Science, Part A: Polymer Chemistry. 1994, 32, 2965-2970.

*Primary Examiner* — Doris Lee
(74) *Attorney, Agent, or Firm* — Dentons US LLP

(57) ABSTRACT

The present invention relates to a polylactide resin having excellent heat resistance, a preparation method thereof, and a polylactide resin composition including the same.
The polylactide resin is characterized by high polymerization activity owing to an organic coordinated metal catalyst even though it has a low catalyst content, and a molecular weight reduction due to thermal decomposition at high temperature and a rate of thermal decomposition including depolymerization are greatly suppressed by a low catalyst content and a low resin acidity, and thus provided is the polylactide resin having superior heat resistance.

14 Claims, 7 Drawing Sheets

POLYLACTIDE RESIN HAVING EXCELLENT HEAT RESISTANCE AND PREPARATION METHOD THEREOF

This application is a divisional of U.S. application Ser. No. 13/704,099, filed on Dec. 13, 2012, which is a National Stage Entry of International Application No. PCT/KR2011/004525, filed Jun. 21, 2011, and claims the benefit of Korean Application No. 10-2010-0058639, filed on Jun. 21, 2010, which are hereby incorporated by reference in their entirety for all purposes as if fully set forth herein.

TECHNICAL FIELD

The present invention relates to a polylactide resin having excellent heat resistance, a preparation method thereof, and a polylactide resin composition including the same.

BACKGROUND ART

Polylactides (or polylactic acids) are a type of resin including a repeating unit of the following General Formula. Unlike conventional petroleum-based resins, the polylactide resins, which are based on biomass, can utilize renewable resources, and their preparation generates less greenhouse gas, $CO_2$, than the preparation of other conventional resins. Also, not only do they have eco-friendly attributes such as biodegradability by water and microorganisms when being buried, but they also possess suitable mechanical strength comparable to the conventional petroleum-based resins.

[General Formula]

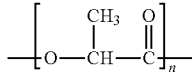

The polylactide resins have been used mainly for disposable packages/containers, coatings, foams, films/sheets, and fibers. Recently, more efforts have been made to enhance the properties of the polylactide resins by mixing them with conventional resins such as ABS, polycarbonate, or polypropylene, and then utilizing them in a semi-permanent use such as for exterior materials of cell phones or interior materials of vehicles. However, the polylactide resins tend to biodegrade in and of themselves due to factors such as the catalyst used in their preparation, moisture in the air, and the like, and up to now such drawbacks of their own properties have limited their application.

Meanwhile, previously known processes for preparing the polylactide resins involve either directly subjecting lactic acid to condensation polymerization or carrying out ring opening polymerization with lactide monomers in the presence of an organometallic catalyst. In this regard, the direct condensation polymerization can produce the polymer at a low cost but it is difficult to obtain the polymers having a high molecular weight in terms of a weight average molecular weight of 100,000 or more, making it difficult to sufficiently ensure the physical and mechanical properties of the polylactide resins. In addition, the ring opening polymerization of the lactide monomers entails a higher cost than the condensation polymerization since the lactide monomers should be prepared from lactic acid, but it can produce a polymer having a relatively high molecular weight and is advantageous in controlling the polymerization, and thus it is commercially used. Representative examples of the catalyst as used in such ring opening polymerization include a Sn-containing catalysts such as $Sn(Oct)_2$ (Oct=2-ethyl hexanoate). However, this catalyst not only promotes the ring opening polymerization, but also tends to accelerate the depolymerization at a conversion rate exceeding a certain level (see U.S. Pat. No. 5,142,023; Leenslag et al. *Makromol. Chem.* 1987, 188, 1809-1814; Witzke et al. *Macromolecules* 1997, 30, 7075-7085). Accordingly, the polylactide resin prepared from the ring opening polymerization tends to have a decreased molecular weight, a broadened molecular weight distribution, and an increased amount of remaining monomers, all of which can have an undesirable effect on the polymer properties.

In other words, the ring opening polymerization of the lactide as described above is a reaction involving a thermodynamic equilibrium between the monomers and the polymer, in which the conversion rate to the polylactide resin increases at the beginning as the polymerization time passes, but the reaction reaches some degree of equilibrium when the conversion rate no longer increases. This also means that the resulting polylactide resin after the polymerization essentially contains a certain amount of the monomer therein. Generally, it has been known that as the reaction temperature becomes higher, the amount of the monomer at the equilibrium state increases, while the reverse holds true as the reaction temperature is reduced. Not only do the monomers remaining in the polylactide resin after the polymerization have detrimental effects on the mechanical properties of the resin, but they also tend to be hydrated, causing corrosion at the time of processing, and can accelerate the decomposition via the depolymerization of the resin. Accordingly, it is very important to control the amount of the monomer remaining after the polymerization.

Due to the foregoing drawbacks, even though the ring opening polymerization previously known in the art is applied, it is difficult to obtain a polylactide resin with a sufficiently high molecular weight and excellent mechanical properties at a high conversion rate because of the depolymerization. Moreover, in their use, the polylactide resins suffered the decomposition caused by the monomers and the catalyst remaining therein, which in turn brought about serious problems in their properties, such as hydrolysis resistance, heat resistance, and the like. Such problems have hindered efforts to apply the polylactide resins for a semi-permanent use, such as for exterior materials of the cell phones and interior materials of vehicles.

Meanwhile, attempts have been made to suppress the depolymerization or the decomposition of the polylactide resin and to obtain polylactide resins having a higher molecular weight and excellent mechanical properties at a high conversion rate.

First, there was an attempt to carry out ring opening polymerization using a Sn-containing catalyst, in which an amine-based proton trapping agent was added in order to prevent the depolymerization. However, even with this method, which could prevent the acid from lowering the catalytic activity or causing a hydrolysis of the resin to some extent, it was found that the depolymerization by the catalyst or the like still proceeded and it was difficult to obtain polylactide resins having a high molecular weight and excellent mechanical properties (Majerska et al. *Macromol Rapid Commun* 2000, 21, 1327-1332; Kowalski et al. *Macromolecules* 2005, 38, 8170-8176).

In addition, the use of a catalyst containing Zn instead of Sn has been considered, but this method has also a drawback of low polymerization activity (Nijenhuis et al. *Macromolecules* 1992, 25, 6419-6424).

On the other hand, some recent reports revealed that the polymerization activity and the molecular weight are increased when the lactides are polymerized by using a Sn(Oct)$_2$P(Ph)$_3$ compound coordinated by a phosphine compound. Expectedly, this was due to the fact that electrons in the Sn-containing catalyst were localized by the phosphine and thereafter the coordination of the lactide monomers was induced faster (see U.S. Pat. No. 6,166,169; Degee et al *Journal Polymer Science Part A; Polymer chemistry* 1999, 37, 2413-2420; Degee et al *Macromol. Symp.* 1999, 144, 289-302). Also, U.S. Pat. No. 5,338,822 discloses a method of preventing the depolymerization, in which the resin melt obtained from the lactide polymerization was subjected to a post-treatment by adding a phosphite-based antioxidant thereto.

Meanwhile, there is a report that hydrolysis resistance of the polylactide resin is improved by kneading the polylactide resin with a carbodiimide compound known to be used as an acid scavenger in polyester processing (Japanese Patent Publication No. 2008-248162).

However, even though hydrolysis resistance can be improved by maintaining the acidity of polylactide resin at a low level by those methods, it is difficult to sufficiently prevent generation of monomer residues by the depolymerization or the resin decomposition thereby. There is another problem that the resin turns yellow or brown after kneading due to the use of chromophore-containing carbodiimide.

DISCLOSURE

Technical Problem

Accordingly, an object of the present invention is to provide a polylactide resin having greatly improved heat resistance.

In particular, another object of the present invention is to provide a preparation method of the polylactide resin having greatly improved heat resistance by controlling the Sn catalyst content in the resin and its acidity at a low level, and a composition including the polylactide resin prepared thereby.

Further, still another object of the present invention is to provide a preparation method of a polylactide resin having excellent mechanical properties, in which the content of residual monomers generated during preparation and processing of the resin is reduced by greatly preventing the depolymerization of the resin, while achieving the above object, and a composition including the polylactide resin prepared thereby.

Further, still another object of the present invention is to provide a preparation method of the polylactide resin having a favorable color, while achieving the above object, and a composition thereof.

Technical Solution

The present invention provides a polylactide resin having
a weight average molecular weight of approximately 100,000~1,000,000,
a content of lactide monomers generated after heat treatment at 220° C. for 1 hour in an amount of less than approximately 0.5% by weight, and
a yellow index of approximately 30 or less.

Further, the present invention provides a preparation method of the polylactide resin, including the step of carrying out ring opening polymerization with lactide monomers in the presence of an organometallic complex of the following Chemical Formula 1:

[Chemical Formula 1]

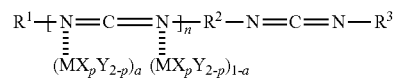

wherein n is an integer of 0~15, p is an integer of 0~2, a is 0 or 1, M is Sn, R$^1$ and R$^3$ are the same as or different from each other, and each of them is hydrogen, substituted or unsubstituted C3 to C10 alkyl, substituted or unsubstituted C3 to C10 cycloalkyl, or substituted or unsubstituted C6 to C10 aryl, R$^2$ is substituted or unsubstituted C3 to C10 alkylene, substituted or unsubstituted C3 to C10 cycloalkylene, or substituted or unsubstituted C6 to C10 arylene, and each of X and Y is independently an alkoxy group or a carboxyl group.

Further, the present invention provides a preparation method of the polylactide resin, including the step of carrying out ring opening polymerization with lactide monomers in the presence of a polymerization catalyst including a mixture of a compound of the following Chemical Formula 2 and a compound of the following Chemical Formula 3:

[Chemical Formula 2]

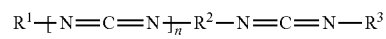

[Chemical Formula 3]

wherein n is an integer of 0~15, M is Sn, R$^1$ and R$^3$ are the same as or different from each other, and each of them is hydrogen, substituted or unsubstituted C3 to C10 alkyl, substituted or unsubstituted C3 to C10 cycloalkyl, or substituted or unsubstituted C6 to C10 aryl, R$^2$ is substituted or unsubstituted C3 to C10 alkylene, substituted or unsubstituted C3 to C10 cycloalkylene, or substituted or unsubstituted C6 to C10 arylene, and each of X and Y is independently an alkoxy group or a carboxyl group.

Further, the present invention provides a polylactide resin composition including the polylactide resin.

Best Mode

Hereinafter, a polylactide resin, a preparation method thereof, and a polylactide resin composition including the same according to specific embodiments of the present invention will be described.

Unless otherwise stated explicitly, several terms as used herein are defined as follows.

Unless particularly mentioned herein, the term "including" or "containing" refers to including some element (or component) without any limitation, and should not be construed as excluding addition of other elements (or components).

Also, in the entire specification, the term "lactide monomer" can be defined as follows. Typically, lactides can be classified into L-lactide consisting of L-lactic acid, D-lactide consisting of D-lactic acid, and meso-lactide consisting of an L-type and a D-type. Also, a mixture of L-lactide and D-lactide (approximately 50:50) is referred to as D,L-lactide or rac-lactide. Among these lactides, the polymerization proceeding only with either of L-lactide and D-lactide that have a high level of optical purity is known to yield an L- or D-polylactide (PLLA or PDLA) with a high level of stereoregularity. Such polylactides have a faster crystallization rate and a higher crystallization degree than a polylactide having a low level of optical purity. However, as used herein, the term "lactide monomer" is defined to include all types of lactides regardless of the characteristic differences of lactides depending on their types and the characteristic differences of the polylactides as obtained therefrom.

In the entire specification, the term "polylactide resin" is defined to comprehensively refer to a homopolymer or copolymer including a repeating unit represented by the following General Formula. Such "polylactide resin" can be prepared by a process including a step of forming the following repeating unit by the ring opening polymerization of the "lactide monomer" as described above. The polymer obtained after the completion of such ring opening polymerization and the formation of the following repeating unit can be referred to as the "polylactide resin." As stated above, the category of the "lactide monomer" includes any types of lactides.

[General Formula]

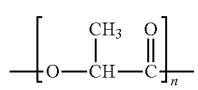

In the category of the polymer that can be referred to as the "polylactide resin", all the polymers are included in any state after the completion of the ring opening polymerization and the formation of the repeating unit, for example, unpurified or purified polymers after the completion of the ring opening polymerization, the polymers contained in the liquid or solid resin composition prior to being molded into an article, or the polymers contained in plastics or woven materials after being molded into an article. Accordingly, in the entire specification, properties of the "polylactide resin" (such as acidity, weight average molecular weight, amount of the catalyst residue, or the like) can be defined by the properties of the polymer in any state after the completion of the ring opening polymerization and the formation of the repeating unit.

The present inventors found that through or in the aftermentioned preparation method using a particular catalyst, depolymerization or thermal decomposition during its use is suppressed by variation of the composition ratio, and thus the prepared polylactide resin has more improved heat resistance, thereby completing the present invention.

According to one embodiment of the present invention, the polylactide resin may have a weight average molecular weight of approximately 100,000~1,000,000, include monomers generated after heat treatment at 220° C. for 1 hour in an amount of less than approximately 0.5% by weight, and have a yellow index of approximately 30 or less. More preferably, the polylactide resin may have a weight average molecular weight of approximately 150,000 to 1,000,000, include lactide monomers generated after heat treatment at 220° C. for 1 hour in an amount of less than approximately 0.5% by weight, and have a yellow index of approximately 25 or less.

Such polylactide resin has a molecular weight higher than the previously known polylactide resins, a minimal amount of lactide monomers generated due to depolymerization, and a low yellow index to minimize yellowing, which have never been satisfied by any previously known polylactide resins. Hereinafter, it will be described in more detail, but it was found that the polylactide resin having the above properties is prepared by using a particular catalyst having a remarkably excellent polymerization activity and a performance of removing decomposition or depolymerization factors, thereby producing the polylactide resin according to one embodiment.

That is, during the preparation process of the polylactide resin, for example, a Sn-containing catalyst for the ring opening polymerization can be used, some of which will inevitably remain in the resulting resin as prepared. Such residual catalyst can be coupled to the end of the polylactide resin and the resulting coupled product causes a hydrolysis reaction or a transesterification reaction by moisture or carboxylic acid, possibly leading to the decomposition of the polylactide resin or a decrease in the molecular weight thereof.

The reaction mediated by the catalyst is a reaction involving a thermodynamic equilibrium between the monomers and the polymer. Therefore, if a small amount of the lactide monomers and the catalyst remain in the polylactide resin, the reaction between the remaining lactide monomers and the polylactide resin can be mediated by the remaining catalyst, which may cause depolymerization of the polylactide resin and a reduction in its molecular weight due to thermodynamic equilibrium. Such decomposition or depolymerization of the polylactide resin may greatly reduce the molecular weight and mechanical properties of the resin, which makes it difficult to utilize the polylactide resin in a semi-permanent use.

However, the polylactide resin according to one embodiment of the present invention can be provided to have a high molecular weight owing to the particular catalyst having an excellent polymerization activity, even though a content of the Sn-containing catalyst with respect to the lactide monomer is smaller than the previous use. Thus, the polylactide resin shows lower content of the residual catalyst than any other resins previously known, and also shows a minimal amount of lactide monomers generated due to depolymerization, and minimal yellowing. Accordingly, owing to the use of the particular catalyst, a reduction in the mechanical properties due to depolymerization or the decomposition of the polylactide resin during its use can be greatly reduced.

Such polylactide resin has a higher molecular weight than the previously known polylactide resins, and more specifically, a weight average molecular weight of up to approximately 1,000,000, thereby showing excellent physical, mechanical properties such as tensile strength in comparison with the previously known polylactide resins. More specifically, the polylactide resin has a high weight average molecular weight of approximately 100,000~1,000,000, preferably approximately 150,000~1,000,000, thereby showing excellent physical, mechanical properties.

Owing to the excellent polymerization activity of the aftermentioned particular catalyst, the polylactide resin can be prepared in the presence of a smaller amount of the catalyst to have a higher molecular weight. Thus, according to the present invention, even though the content of the Sn catalyst with respect to the lactide monomer is smaller than that in any previously known polylactide resins, that is, even though the catalyst is used in a small amount of approximately 1:200,000~approximately 1:100,000 (mole/mole ratio), the polylactide resin having a weight average molecular weight as high as approximately 100,000~approximately 1,000.000 (g/mol) can be prepared, and its thermal decomposition caused by the residual catalyst during or after the polymerization can be also minimized. Accordingly, the amount of the catalyst remaining in the polylactide resin can be minimized, and thermal stability at high temperature can be greatly improved.

The experimental results of the present inventors revealed that the polylactide resin maintained approximately 95% or more of its weight average molecular weight at 220° C. for 5 minutes without addition of any other antioxidant, and thus it has excellent heat resistance.

The polylactide resin according to one embodiment of the present invention may have a reduction rate of weight average molecular weight of approximately −2500 g/mol·hr or less, after heat treatment at 220° C. for 40 minutes.

In addition, a mass-loss rate constant k of the polylactide resin, calculated by the following Equation 1, may be approximately 10 hr$^{-1}$ or less, and more preferably approximately 2 to 8 hr$^{-1}$, when being isothermally heated at 260° C. for 30 minutes according to thermal gravimetric analysis (TGA).

$$m(t)=m(o)-kt$$ [Equation 1]

wherein m(o) represents the mass of the initial polylactide resin, m(t) represents the mass of the polylactide resin at the isothermal heating time (t), t represents time, and k represent a rate constant.

In addition, the mass means the pure mass of the polylactide resin under each condition.

Herein, the mass-loss rate constant k is a specific value resulting from the quantification of a reduction in the weight average molecular weight of the polylactide resin over time under the predetermined conditions.

According to one embodiment of the present invention, the polylactide resin satisfies all of the properties owing to the excellent activity of the after-mentioned particular catalyst, and thus the use of the Sn-containing catalyst causing discoloration is minimized to greatly suppress the discoloration during or after polymerization. Consequently, the resin having the improved color can be provided.

The previously known polylactide resin has a problem of a yellowish color after kneading because of the use of chromophore-containing carbodiimide, which has limited the addition amount of carbodiimide. Therefore, the present invention greatly improves the color of the resin by reducing the Sn content of the after-mentioned particular catalyst.

The experimental results of the present inventors revealed that the content of Sn catalyst can be reduced to 4 ppm owing to the high polymerization activity of the particular catalyst, and therefore the yellow index can be reduced to approximately 30 or less, preferably approximately 25 or less even though a predetermined or greater amount of the carbodiimide compound is included, so as to greatly improve the color of the polylactide resin.

According to one embodiment of the present invention, owing to the excellent activity of the after-mentioned particular catalyst, the polylactide resin is controlled to have low acidity while satisfying the above properties, so that the generation of residual monomers due to depolymerization during or after polymerization can be minimized.

Further, the polylactide resin according to one embodiment of the present invention may have an acidity of approximately 20 meq/kg or less, preferably approximately 10 meq/kg or less, and more preferably approximately 3 to 15 meq/kg or less, because the carbodiimide component contained in the particular catalyst for the preparation of the polylactide resin can be coupled with moisture or an acid to remove it. Consequently, the polylactide resin is able to have a lower acidity than the previously known resins. Specifically, the carbodiimide component contained in the particular catalyst functions as an acid scavenger for acidic groups in the polymerization solution or carboxylic acid at the chain end of the polylactide molecule, thereby reducing the acidity of the resin.

As described above, the moisture or acid may cause a transesterification reaction of the polylactide resin which is mediated by the catalyst remaining in the resin, possibly leading to a decrease in the molecular weight and mechanical properties of the polylactide resin. However, the polylactide resin according to the embodiment of the present invention shows lower acidity as mentioned above so that the decomposition or depolymerization of the polylactide resin or the decrease in the molecular weight thereof can be suppressed during its use, and thus the decrease in the mechanical properties during its use can be greatly reduced, allowing semi-permanent use of the polylactide resin.

Moreover, the present invention provides a polylactide resin having greatly improved thermal stability at high temperature while minimizing the addition amount of a metal deactivator. Such polylactide resin shows an excellent property of generating approximately 0.5% by weight or less of monomers by depolymerization when heat-treated at 220° C. for 1 hour without addition of the metal deactivator. Therefore, it was revealed that cost-effective production of the polylactide resin is possible without using the expensive metal deactivator.

The polylactide resin also minimizes the amount of the metal residue, that is, the amount of the residual catalyst which remains in the resin after polymerization. More particularly, the polylactide resin may have a smaller amount of the residual catalyst than those prepared by the previously known methods, that is, it may contain the catalyst-derived Sn metal residue in an amount of approximately 15 ppm or less, preferably approximately 10 ppm or less, more preferably approximately 7 ppm or less, and most preferably approximately 3 to 7 ppm or less, based on the weight of the polylactide resin. The residual catalyst is present at such a small amount that the bonding of the residual catalyst to the end of the polylactide resin and its triggering of a back-biting reaction or a transesterification reaction can be suppressed, and therefore the decomposition of the polylactide resin or the decrease in the molecular weight thereof or discoloration thereof can be reduced. Therefore, the polylactide resin with the decreased amount of residual catalyst can show superior heat resistance.

During the use of the polylactide resin containing the small amount of the metal residue, namely, the small amount of the residual catalyst, the depolymerization or decomposition can be minimized, and therefore the reduction in the mechanical properties can be minimized so that the polylactide resins can maintain their physical or mechanical properties such as tensile strength at an excellent level, and thus can be applied for a semi-permanent use.

In contrast, if the amount of the metal residue exceeds approximately 15 ppm, the depolymerization or decomposition during its use more greatly occurs, thereby reducing the mechanical properties. Thus, it is difficult to apply the resin for a semi-permanent use, like the previously known polylactide resins.

Meanwhile, the above described polylactide resin according to one embodiment of the present invention can be obtained by using a novel particular catalyst having an excellent polymerization activity. Such particular catalyst is the residual catalyst, and it may be a catalyst composition including an organometallic complex of the following Chemical Formula 1 and a mixture of the compounds of the following Chemical Formulae 2 and 3:

[Chemical Formula 1]

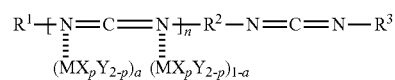

-continued

[Chemical Formula 2]

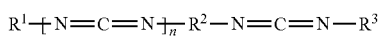

[Chemical Formula 3]

MX$_p$Y$_{2-p}$ wherein n is an integer of 0~15, p is an integer of 0~2, M is Sn, R$^1$ and R$^3$ are the same as or different from each other, and each of them is hydrogen, substituted or unsubstituted C3 to C10 alkyl, substituted or unsubstituted C3 to C10 cycloalkyl, substituted or unsubstituted C6 to C10 aryl, R$^2$ is substituted or unsubstituted C3 to C10 alkylene, substituted or unsubstituted C3 to C10 cycloalkylene, substituted or unsubstituted C6 to C10 arylene, and each of X and Y is independently an alkoxy group or a carboxyl group.

The novel catalyst of the present invention is a carbodiimide-Sn organic complex, and carbodiimide-(Sn(Oct)$_2$) (carbodiimide-tin(II) 2-ethylhexanoate) is preferred.

That is, if the polymerization catalyst is the organometallic complex of Chemical Formula 1 or the mixture of Chemical Formulae 2 and 3, it may be in a form of a carbodiimide-Sn (Oct)$_2$ organic complex during the polymerization.

The organometallic complex of Chemical Formula 1 or the mixture of the compounds of the Chemical Formulae 2 and 3 may have approximately 10 or higher of a catalytic activity represented by the following Equation 1.

Catalytic activity=kg(polymer)/g(cat)·hr  [Equation 2]

The novel catalyst shows the excellent polymerization activity, and therefore, the polylactide resin having high molecular weight can be obtained in the presence of a smaller amount of the catalyst.

Hereinafter, a more detailed description will be given, but the novel catalyst, in particular, the carbodiimide component corresponding to Chemical Formula 2 may react with moisture (H$_2$O) or carboxylic acid which remains in the resin, or moisture or —COOH functional groups such as or octanoic acid which remains in the catalyst, thereby removing them.

The hydrolysis of the polylactide resin is more accelerated by acids, and in the present invention, the moisture or acidic group remaining in the resin can be removed by using the particular catalyst. In other words, because the acid can function as a catalyst in the hydrolysis of the polylactide resin, the polylactide resin containing a small amount of moisture or acid is able to exhibit an excellent performance of hydrolysis resistance.

In this regard, general chemical reaction of the carbodiimide and moisture, carboxylic acid can be represented by the following Reaction Schemes 1 and 2:

[Reaction Scheme 1]

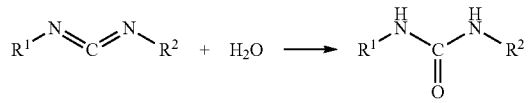

[Reaction Scheme 2]

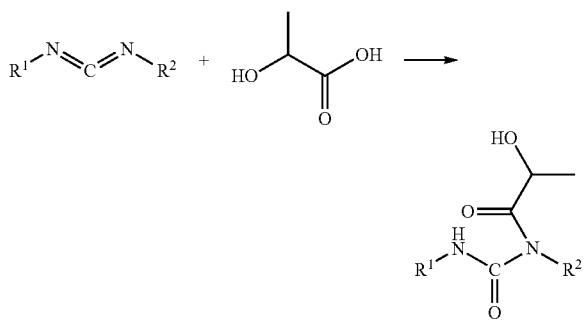

wherein R$^1$ and R$^2$ are the same as or different from each other, and each of them is hydrogen, substituted or unsubstituted C3 to C10 alkyl, substituted or unsubstituted C3 to C10 cycloalkyl, or substituted or unsubstituted C6 to C10 aryl.

Hereinafter, a more detailed description will be given, but the novel catalyst, in particular, the carbodiimide component corresponding to Chemical Formula 2 reacts with a hydroxyl group (—OH functional group) remaining in the resin, so as to reduce the concentration of the hydroxyl group in the resin. Therefore, the polylactide resin having the reduced concentration of the hydroxyl group can be provided in a monomer depolymerization-suppressed state.

As shown in the following Reaction Scheme 3, a mechanism of the monomer depolymerization of the polylactide resin shows that the terminal hydroxyl group of the polylactide resin attacks the neighboring carbonyl group. Thus, lactide monomers may exist after polymerization of the polylactide resin.

[Reaction Scheme 3]

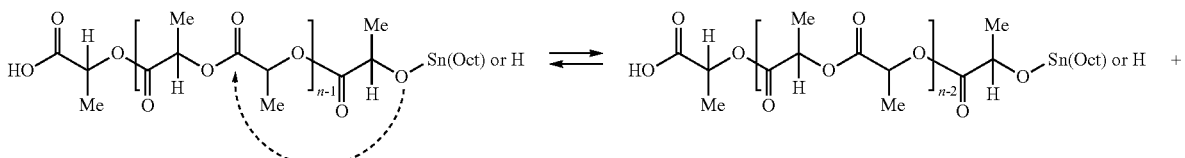

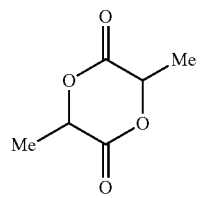

However, if the lactide monomers remain in the polylactide resin, the remaining lactide is easily denatured to lactic acid at a high temperature of 180° C. or higher. The terminal carboxylic acid of the lactic acid can function as a catalyst in the hydrolysis, as described above. Moreover, during processing of the polylactide resin containing a large amount of the lactide monomer, fume is generated due to evaporation of lactide, which generates problems of deteriorating the working environment and causing corrosion of processing machines. In the preparation of the polylactide resin or in the processing of the prepared resin, therefore, it is very important to maintain the content of the lactide monomer remaining in the resin at a low level, and the preferred content is approximately less than 2% by weight, more preferably approximately less than 0.5% by weight, and much more preferably approximately less than 0.2% by weight. In the present invention, the content of the lactide monomer generated after heat treatment at 220° C. for 1 hr is approximately less than 0.5% by weight, more preferably approximately less than 0.1 to 0.3% by weight without using the metal deactivator that has been previously used for suppressing the resin decomposition due to depolymerization of monomers. Therefore, the depolymerization can be greatly suppressed after preparation of the polylactide resin. In this regard, the content of the residual lactide monomer may be based on the total weight of the polylactide resin and the residual lactide monomer.

As such, the present invention provides the resin having a low concentration of hydroxyl group by using the novel catalyst having excellent polymerization activity so as to maximize the suppression of depolymerization. Consequently, the polylactide resin is able to show excellent heat resistance because the monomer depolymerization is suppressed due to the low concentration of hydroxyl group.

In general, a major cause of discoloration of the polylactide resin is known to be various impurities including Sn. Hereinafter, a more detailed description will be given, but a small amount of the Sn catalyst can be used in the preparation of the polylactide resin owing to the high activity of the above described carbodiimide-Sn catalyst, thereby reducing discoloration of the polylactide resin during polymerization or in the post-processing at high temperature. Therefore, the polylactide resin showing the low Sn content can be provided with minimal discoloration.

Meanwhile, according to another embodiment of the present invention, a preparation method of the above described polylactide resin is provided. According to an Example of the present invention, the preparation method may include the step of carrying out ring opening polymerization with lactide monomers in the presence of the polymerization catalyst of the organometallic complex of Chemical Formula 1. Further, according to another Example of the present invention, the preparation method may include the step of carrying out ring opening polymerization with lactide monomers in the presence of the polymerization catalyst including the mixture of the compounds of Chemical Formulae 2 and 3.

In the preparation method, the polylactide resin is prepared by carrying out ring opening polymerization with lactide monomers in the presence of the organometallic complex of Chemical Formula 1 including a carbodiimide component attached in the presence of the metal catalyst, or the mixture of the carbodiimide-based compound of Chemical Formula 2 and the metal catalyst of Chemical Formula 3.

As substantiated by the following Examples, these novel catalyst, that is, the organometallic complex of Chemical Formula 1, or the mixture of the compounds of Chemical Formulae 2 and 3 exhibit excellent polymerization activity as a carbodiimide-Sn catalyst. Thus, even though the catalyst is used in a small amount, the polylactide resin having a high molecular weight can be obtained.

Meanwhile, it was known that in the ring opening polymerization of the lactide monomers, the catalyst reacts with an initiator having a hydroxy group or moisture to form a metal hydroxy or alkoxide compound, which is actually used as a catalytically active species. In other words, the ring opening polymerization is promoted by the metal hydroxy or alkoxide compound to produce a polylactide resin. In the process of forming the metal hydroxy or alkoxide compound, some compounds having a carboxylic acid group or a hydroxy group are left behind, involving the depolymerization or the decomposition of the polylactide resin (see Kowalski et al. Macromolecules 2000, 33, 7359-7370).

More specifically, it is expected that the depolymerization or the decomposition that occurs as an equilibrium reaction for the polymerization of the polylactide resin is triggered by a hydrolysis reaction caused either by the carboxylic acid or by the moisture and lactic acid contained in the lactide monomer, a back-biting reaction caused by the catalyst bonded to the end of the polymer chain, or a transesterification reaction between the polymer chains with the catalyst bonded at their end and the carboxylic acid.

In this regard, the specific carbodiimide component contained in the organometallic complex of Chemical Formula 1 or the novel catalyst of Chemical Formulae 2 and 3 can be coupled with the moisture or the carboxylic acid so as to eliminate the same, thereby showing excellent polymerization activity. Therefore, when the ring opening polymerization of the lactide monomer is carried out using the novel catalyst, the carbodiimide acts as a carboxylic acid scavenger in the polymerization solution to suppress the hydrolysis reaction or the transesterification reaction that is caused by the moisture or the carboxylic acid, and therefore the depolymerization or the decomposition of the polylactide resin can be greatly reduced.

According to the preparation method using the novel catalyst of another embodiment of the present invention, the catalyst shows excellent polymerization activity and inhibition effect against the depolymerization, making it possible to produce high-molecular weight polylactide resins at a high conversion rate.

The novel catalyst also acts to remove moisture or acids, and according to the above preparation method, it can produce a polylactide resin having a lower level of acidity and therefore the decomposition of the polylactide resin after the polymerization or during its use can also be greatly suppressed.

In addition, because the novel catalyst shows excellent polymerization activity, the use of a relatively small amount makes it possible to produce high-molecular weight polylactide resins while curbing the amount of residual catalyst to a low level. It is known that the polylactide resin tends to be easily discolored during polymerization or high temperature-processing, and this discoloration is mainly caused by the content of the Sn-containing catalyst, formation of double bond within the main chain of the polymer by thermal decomposition, or production of ketone-base compounds. In addition, the organic carbodiimide compound of the novel catalyst has a problem of discoloration at high temperature. Thus, as described above, when carbodiimide is used as the carboxylic acid scavenger, its content and application have been limited. Owing to the excellent polymerization activity of the novel catalyst, high-molecular weight polylactide resins can be produced even though the Sn-containing catalyst is used in a smaller amount than that in the previously known polylactide resin, and thus discoloration of the resin can be greatly inhibited during polymerization or processing thereof.

Accordingly, the preparation method according to another embodiment of the present invention can be used to produce a polylactide resin suitable for a semi-permanent use, that is, a polylactide resin having a high weight average molecular weight and a low acidity at a high conversion rate.

Meanwhile, in the above preparation method, the compound of Chemical Formula 1 or 2 has a specific carbodiimide structure substituted with a C3 to C10 alkyl group, cycloalkyl group, alkylene group, or cycloalkylene group, or a C6 to C10 aryl group or arylene group. As substantiated by the following examples and comparative examples, such specific carbodiimide structure of the compound shows excellent polymerization activity while effectively removing the moisture or the acids contained in the resin, thereby producing the polylactide resin with the high molecular weight and the low acidity. More specifically, as the compound of Chemical Formula 1 or 2, a compound wherein $R^1$ and $R^3$ are monovalent phenyl groups substituted with a C1 to C10 alkyl group, or a C3 to C10 alkyl group or cycloalkyl group, and $R^2$ is a divalent phenylene group substituted with a C1 to C10 alkyl group or a C3 to C10 alkylene group or cycloalkylene group can be used.

Also, the $MX_pY_{2-p}$ attached to Chemical Formula 1, or the compound of Chemical Formula 3 can be a compound containing Sn, or any mixture of at least two of the foregoing compounds, and representative examples of such compound include tin(II) 2-ethylhexanoate(Sn(Oct)$_2$).

The polymerization catalyst according to one embodiment of the present invention may be an organic carbodiimide-Sn (Oct)$_2$ complex having the carbodiimide component of approximately less than 0.5% by weight, more preferably approximately 0.01 to 0.2% by weight. The polymerization catalyst may be also an organic carbodiimide-Sn(Oct)$_2$ complex having the Sn catalyst of approximately 4~50 ppm. The polymerization catalyst may be also an organic carbodiimide-Sn(Oct)$_2$ complex having the Sn catalyst of approximately 4 to 8 ppm, and most preferably approximately less than 4 to 6 ppm. In this regard, if the content of the Sn catalyst is approximately 4 to 8 ppm, the yellow index may be approximately 30 or less, and if the content of the Sn catalyst is approximately less than 4 to 6 ppm, the yellow index may be approximately 25 or less. Thus, yellowing can be greatly reduced, compared to the previous one.

The organometallic complex of Chemical Formula 1 can be prepared by a process including a step of reacting the compounds of Chemical Formula 2 and Chemical Formula 3, as substantiated by the following examples.

Further, in the preparation method according to other embodiments of the present invention, the ring opening polymerization may be carried out by adding the organometallic complex of Chemical Formula 1 at a ratio of approximately 1:200,000~1:100,000 (mole/mole ratio) with respect to the lactide monomers, which is smaller than that of the resin.

If the polymerization catalyst including the compounds of Chemical Formulae 2 and 3 is used, the compound of Chemical Formula 3 in the polymerization catalyst may be added at a ratio of 1:200,000~1:100,000 (mole/mole ratio) with respect to the lactide monomers. In this case, the carbodiimide component of Chemical Formula 2 in the polymerization catalyst may be added in an amount of less than 0.5% by weight, more preferably approximately 0.01 to 0.2% by weight, based on the weight of the lactide monomers.

If the addition ratio of the catalyst becomes extremely low, the polymerization activity would be undesirably insufficient. In contrast, if the addition ratio of the catalyst becomes extremely high, the amount of the catalyst remaining in the polylactide resin as produced would increase so as to bring about the decomposition or the decrease in the molecular weight. In the preparation method of the polylactide resin, either the organometallic complex of Chemical Formula 1 as a single catalyst or the catalyst composition including the compounds of Chemical Formula 2 and Chemical Formula 3 as a catalyst can be used. In terms of a high molecular weight of the resin as obtained from the polymerization, the polymerization activity, or the conversion rate to the resin, it is more preferable to use the organometallic complex of Chemical Formula 1 as a single catalyst.

Moreover, when the catalyst composition including the compounds of Chemical Formulae 2 and 3 is used, these compounds can be added either simultaneously or sequentially with an interval therebetween. Further, they can be added either before the addition of monomers or prior to the initiation of the polymerization within a certain time, or directly before the initiation of the polymerization. However, in order to allow the compounds of Chemical Formulae 2 and 3 to react to some extent and form a complex therebetween, it is preferable that the compounds of Chemical Formulae 2 and 3 are simultaneously added at a predetermined time before the initiation of the polymerization and then the monomers are added to initiate the polymerization.

Also, in the preparation method of the polylactide resin, the ring opening polymerization can be carried out in the presence of an initiator including a compound with a hydroxyl group. The initiator can play a role of reacting with the catalyst to actually form a catalytic species and initiate the ring opening polymerization. Additionally, the initiator can take part in some of the depolymerization or the decomposition of the resin to play a role of controlling the molecular weight of the polylactide resin.

As the initiator, any compound with a hydroxy group can be used without limitation. However, a compound having less than 8 carbon atoms can be vaporized at the temperature of the ring opening polymerization due to its low molecular weight, and this can hinder its involvement in the polymerization reaction. Therefore, a compound with a hydroxy group that can be preferably used as the initiator has at least 8 carbon atoms.

Moreover, to carry out the ring opening polymerization, the initiator can be added at a ratio of approximately 0.001 to 1 mole, preferably approximately 0.005 to 0.5 mole with respect to 100 moles of the lactide monomers. If the addition ratio of the initiator becomes extremely low, the molecular weight of the resin as obtained would be so high that subsequent processing can become difficult. If the addition ratio of the initiator becomes too high, the molecular weight and polymerization activity of the resin can decrease.

Also, for the ring opening polymerization of the lactide monomer, it is preferable that bulk polymerization is substantially carried out without using any solvent. In this regard, "without using any solvent" includes the use of a small amount of a solvent for dissolving the catalyst, for example, less than at most 1 mL of a solvent per kilogram of the lactide monomer.

As the ring opening polymerization is carried out by bulk polymerization, it is possible to eliminate a process for removing the solvent after the polymerization and to avoid decomposition or loss of the resin in such a solvent elimination process. Further, the bulk polymerization makes it possible to obtain the polylactide resin at a high conversion rate and at a high yield.

Moreover, the ring opening polymerization of the lactide monomers can be performed at a temperature of 120 to 200°

C. for approximately 0.5 to 8 hours, preferably approximately 0.5 to 4 hours. In the above preparation method, because the catalyst with superior activity is used, the ring opening polymerization carried out even for a shorter period than known before can provide a polylactide resin with a high molecular weight at a high conversion rate and at a high yield. Also, because the polymerization proceeds for a short period of time, the depolymerization, decomposition, or discoloration of the resin can be preferably reduced.

According to the preparation method as described above, it is possible to produce the polylactide resin having a high molecular weight, a low acidity, and a low Sn catalyst content, and thus the polylactide resin according to one embodiment of the present invention, for example, the polylactide resin having excellent mechanical properties such as heat resistance can be produced at a high conversion rate.

In accordance with another embodiment of the present invention, a polylactide resin composition including the above described polylactide resin is provided.

The polylactide resin composition includes the polylactide resin with excellent mechanical properties, hydrolysis resistance, and heat resistance, and thus demonstrates excellent physical and mechanical properties so that it can be preferably utilized in a semi-permanent use such as for packaging for electronics or interior materials for vehicles.

The polylactide resin composition can include the polylactide resin either alone or in combination with a polycarbonate resin, an ABS resin, or a polypropylene resin. However, in order to exhibit unique properties of the polylactide resin, the resin composition can include the polylactide resin in an amount of approximately 40% by weight or more, preferably approximately 60% by weight or more, and more preferably approximately 80% by weight, based on the content of the total resins contained therein.

Also, the polylactide resin composition can further include various additives that have been contained in a wide range of conventional resin compositions.

The polylactide resin compositions can be produced either as liquid or solid resin compositions prior to molding into the end-product or as plastics or woven materials in their end-product state. The resulting plastics or woven materials can be prepared by typical processes depending on the type of each product.

Advantageous Effects

As described above, the present invention provides a novel catalyst such as an organometallic complex, which can be used for producing a polylactide resin having excellent properties such as mechanical properties, hydrolysis resistance, and heat resistance at a high conversion rate, and a preparation method of the polylactide resin.

Therefore, for the polylactide resin that had been previously used only as a disposable material, the present invention can make a great contribution to enabling it to be used not only for disposable products such as food wrapping films, household item films, and sheets, but also for various types of goods requiring a semi-permanent use such as packaging for electronics or interior materials for vehicles.

MODE FOR INVENTION

Figure 1:
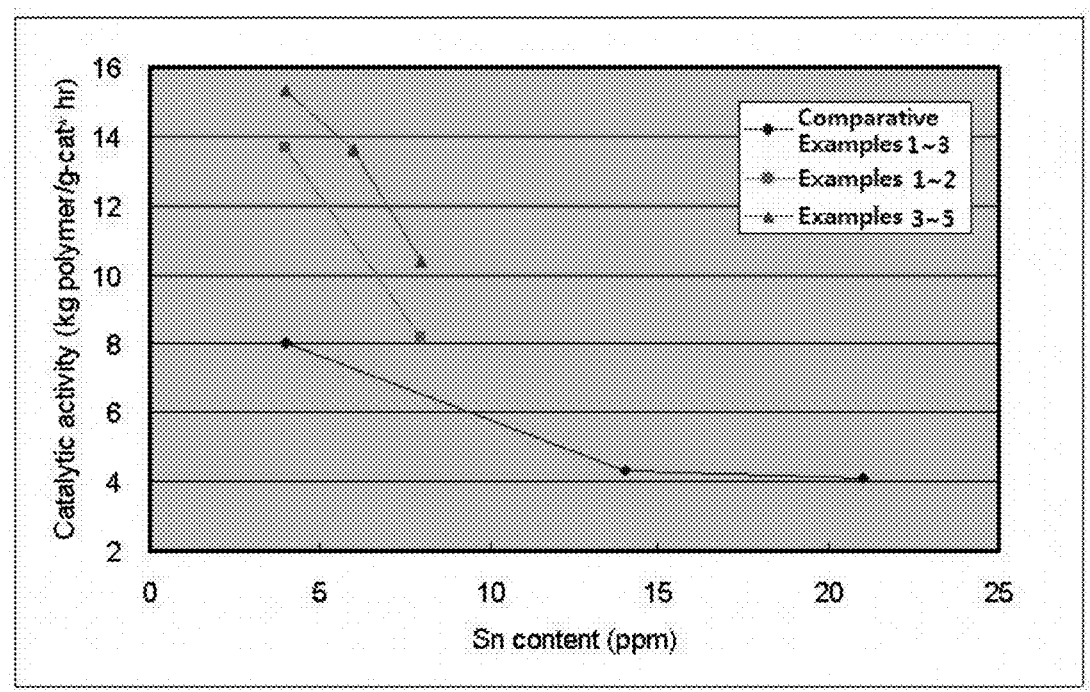
FIG. 1 is a graph showing the comparison of catalytic activity between Comparative Example 1-3 and Example 1-5 according to changes in the $Sn(Oct)_2$ and carbodiimide contents.

Hereinafter, the actions and the effects of the present invention will be explained in more detail via specific examples of the present invention. However, these examples are merely illustrative of the present invention and the scope of the invention should not be construed to be defined thereby.

EXPERIMENTAL METHOD

The following examples and comparative examples were conducted using standard Schlenk techniques or dry box techniques for all operations of handling compounds that are sensitive to air or water.

Nuclear magnetic resonance spectrums were obtained using a Bruker 600 Spectrometer, and $^1$H-NMR was measured at 600 MHz.

The molecular weight of the polymer and the molecular weight distribution thereof were measured by gel permeation chromatography (GPC) using a polystyrene sample as a standard.

Comparative Example 1

$Sn(Oct)_2$=1: 40,000

2 kg (13.8 mol) of solid-phase L-lactide monomer that was maintained at acidity of 50 meqKOH/Kg or less and at a moisture content of 200 ppm or less was injected into a 5 L-stirred tank reactor, and moisture and oxygen were sufficiently removed from the monomers and reactor under vacuum. Subsequently, as an initiator, 6.46 g (0.035 mol) of dodecanol (Sigma-Aldrich, Mw=186.34 g/mol) and 0.141 g (0.35 mmol, 1: 40,000 mol/lactide mol) of $Sn(Oct)_2$ (Sigma-Aldrich, Mw=405.1 g/mol) were injected using a reactor charge port. After completing injection of the materials, the reactor was heated by heating hot oil. When the reactor temperature reached 100~130° C., the reactor was stirred. Polymerization was performed within the reactor temperature of 160~190° C. until the reactor viscosity became constant. When the reactor viscosity reached a predetermined level, the stirring was stopped. Then, a bottom drain valve was opened to inject $N_2$ gas into the reactor, and a polylactide resin strand was finally obtained. The polymerization time was 3.3 hrs, and the resin had a conversion rate of 96.0%, and a weight average molecular weight of 177,500 g/mol.

Comparative Example 2

$Sn(Oct)_2$=1: 60,000

2 kg (13.8 mol) of solid-phase L-lactide monomer that was maintained at acidity of 50 meqKOH/Kg or less and at a moisture content of 200 ppm or less was injected into a 5 L-stirred tank reactor, and moisture and oxygen were sufficiently removed from the monomers and reactor under vacuum. Subsequently, as an initiator, 6.46 g (0.035 mol) of dodecanol (Sigma-Aldrich, Mw=186.34 g/mol) and 0.094 g (0.23 mmol, 1: 60,000 mol/lactide mol) of $Sn(Oct)_2$ (Sigma-Aldrich, Mw=405.1 g/mol) were injected using a reactor charge port. After completing injection of the materials, the reactor was heated by heating hot oil. When the reactor temperature reached 100~130° C., the reactor was stirred. Polymerization was performed within the reactor temperature of 160~190° C. until the reactor viscosity became constant. When the reactor viscosity reached a predetermined level, the stirring was stopped. Then, a bottom drain valve was opened to inject $N_2$ gas into the reactor, and a polylactide resin strand was finally obtained. The polymerization time was 4.7 hrs, and the resin had a conversion rate of 96.1%, and a weight average molecular weight of 168,500 g/mol.

Comparative Example 3

$Sn(Oct)_2$=1: 200,000

2 kg (13.8 mol) of solid-phase L-lactide monomer that was maintained at acidity of 50 meqKOH/Kg or less and at a moisture content of 200 ppm or less was injected into a 5 L-stirred tank reactor, and moisture and oxygen were sufficiently removed from the monomers and reactor under vacuum. Subsequently, as an initiator, 6.46 g (0.035 mol) of dodecanol (Sigma-Aldrich, Mw=186.34 g/mol) and 0.028 g (0.07 mmol, 1: 200,000 mol/lactide mol) of $Sn(Oct)_2$ (Sigma-Aldrich, Mw=405.1 g/mol) were injected using a reactor charge port. After completing injection of the materials, the reactor was heated by heating hot oil. When the reactor temperature reached 100~130° C., the reactor was stirred. Polymerization was performed within the reactor temperature of 160~190° C. until the reactor viscosity became constant. When the reactor viscosity reached a predetermined level, the stirring was stopped. Then, a bottom drain valve was opened to inject $N_2$ gas into the reactor, and a polylactide resin strand was finally obtained. The polymerization time was 8.1 hrs, and the resin had a conversion rate of 94.5%, and a weight average molecular weight of 151,900 g/mol.

Example 1

Organic Carbodiimide-$Sn(Oct)_2$ Complex/Lactide Ring Opening Polymerization (Polymerization Catalyst: a Mixture of Carbodiimide (0.05 Wt %) and $Sn(Oct)_2$=1: 100,000 Mol/Lactide Mol)

2 kg (13.8 mol) of solid-phase L-lactide monomer that was maintained at acidity of 50 meqKOH/Kg or less and at a moisture content of 200 ppm or less was injected into a 5 L-stirred tank reactor, and moisture and oxygen were sufficiently removed from the monomers and reactor under vacuum. Subsequently, as the initiator, 6.46 g (0.035 mol) of dodecanol (Sigma-Aldrich, Mw=186.34 g/mol), and as a polymerization catalyst, a mixture of 0.056 g (0.14 mmol, 1: 100,000 mol/lactide mol) of $Sn(Oct)_2$ (Sigma-Aldrich, Mw=405.1 g/mol) and 1 g of carbodiimide (Reine Chem, stabaxol P) were injected using a reactor charge port. After completing injection of the materials, the reactor was heated by heating hot oil. When the reactor temperature reached 100~130° C., the reactor was stirred. Polymerization was performed within the reactor temperature of 160~190° C. until the reactor viscosity became constant. When the reactor viscosity reached a predetermined level, the stirring was stopped. Then, a bottom drain valve was opened to inject $N_2$ gas into the reactor, and a polylactide resin strand was finally obtained. The polymerization time was 4.2 hrs, and the resin had a conversion rate of 96.3%, and a weight average molecular weight of 178,900 g/mol.

Example 2

Organic Carbodiimide-$Sn(Oct)_2$ Complex/Lactide Ring Opening Polymerization (Polymerization Catalyst: a Mixture of Carbodiimide (0.05 Wt %) and $Sn(Oct)_2$=1: 200,000 Mol/Lactide Mol)

2 kg (13.8 mol) of solid-phase L-lactide monomer that was maintained at acidity of 50 meqKOH/Kg or less and at a moisture content of 200 ppm or less was injected into a 5 L-stirred tank reactor, and moisture and oxygen were sufficiently removed from the monomers and reactor under vacuum. Subsequently, as the initiator, 6.46 g (0.035 mol) of dodecanol (Sigma-Aldrich, Mw=186.34 g/mol), and as a polymerization catalyst, a mixture of 0.028 g (0.07 mmol, 1: 200,000 mol/lactide mol) of $Sn(Oct)_2$ (Sigma-Aldrich, Mw=405.1 g/mol) and 1 g of carbodiimide (Reine Chem, stabaxol P) were injected using a reactor charge port. After completing injection of the materials, the reactor was heated by heating hot oil. When the reactor temperature reached 100~130° C., the reactor was stirred. Polymerization was performed within the reactor temperature of 160~190° C. until the reactor viscosity became constant. When the reactor viscosity reached a predetermined level, the stirring was stopped. Then, a bottom drain valve was opened to inject $N_2$ gas into the reactor, and a polylactide resin strand was finally obtained. The polymerization time was 5.0 hrs, and the resin had a conversion rate of 95.6%, and a weight average molecular weight of 164,500 g/mol.

Example 3

Organic Carbodiimide-$Sn(Oct)_2$ Complex/Lactide Ring Opening Polymerization (Polymerization Catalyst: a Mixture of Carbodiimide (0.1 Wt %) and $Sn(Oct)_2$=1: 100,000 Mol/Lactide Mol)

2 kg (13.8 mol) of solid-phase L-lactide monomer that was maintained at acidity of 50 meqKOH/Kg or less and at a moisture content of 200 ppm or less was injected into a 5 L-stirred tank reactor, and moisture and oxygen were sufficiently removed from the monomers and reactor under vacuum. Subsequently, as the initiator, 6.46 g (0.035 mol) of dodecanol (Sigma-Aldrich, Mw=186.34 g/mol), and as a polymerization catalyst, a mixture of 0.056 g (0.14 mmol, 1: 100,000 mol/lactide mol) of $Sn(Oct)_2$ (Sigma-Aldrich, Mw=405.1 g/mol) and 2 g of carbodiimide (Reine Chem, stabaxol P) were injected using a reactor charge port. After completing injection of the materials, the reactor was heated by heating hot oil. When the reactor temperature reached 100~130° C., the reactor was stirred. Polymerization was performed within the reactor temperature of 160~190° C. until the reactor viscosity became constant. When the reactor viscosity reached a predetermined level, the stirring was stopped. Then, a bottom drain valve was opened to inject $N_2$ gas into the reactor, and a polylactide resin strand was finally obtained. The polymerization time was 4.3 hrs, and the resin had a conversion rate of 96.2%, and a weight average molecular weight of 177,200 g/mol.

Example 4

Organic Carbodiimide-Sn(Oct)$_2$ Complex/Lactide Ring Opening Polymerization (Polymerization Catalyst: a Mixture of Carbodiimide (0.1 Wt %) and Sn(Oct)$_2$=1: 150,000 Mol/Lactide Mol)

2 kg (13.8 mol) of solid-phase L-lactide monomer that was maintained at acidity of 50 meqKOH/Kg or less and at a moisture content of 200 ppm or less was injected into a 5 L-stirred tank reactor, and moisture and oxygen were sufficiently removed from the monomers and reactor under vacuum. Subsequently, as the initiator, 6.46 g (0.035 mol) of dodecanol (Sigma-Aldrich, Mw=186.34 g/mol), and as a polymerization catalyst, a mixture of 0.037 g (0.09 mmol, 1: 150,000 mol/lactide mol) of Sn(Oct)$_2$ (Sigma-Aldrich, Mw=405.1 g/mol) and 2 g of carbodiimide (Reine Chem, stabaxol P) were injected using a reactor charge port. After completing injection of the materials, the reactor was heated by heating hot oil. When the reactor temperature reached 100~130° C., the reactor was stirred. Polymerization was performed within the reactor temperature of 160~190° C. until the reactor viscosity became constant. When the reactor viscosity reached a predetermined level, the stirring was stopped. Then, a bottom drain valve was opened to inject N$_2$ gas into the reactor, and a polylactide resin strand was finally obtained. The polymerization time was 3.8 hrs, and the resin had a conversion rate of 95.8%, and a weight average molecular weight of 168,200 g/mol.

Example 5

Organic Carbodiimide-Sn(Oct)$_2$ Complex/Lactide Ring Opening Polymerization (Polymerization Catalyst: a Mixture of Carbodiimide (0.1 Wt %) and Sn(Oct)$_2$=1: 200,000 Mol/Lactide Mol)

2 kg (13.8 mol) of solid-phase L-lactide monomer that was maintained at acidity of 50 meqKOH/Kg or less and at a moisture content of 200 ppm or less was injected into a 5 L-stirred tank reactor, and moisture and oxygen were sufficiently removed from the monomers and reactor under vacuum. Subsequently, as the initiator, 6.46 g (0.035 mol) of dodecanol (Sigma-Aldrich, Mw=186.34 g/mol), and as a polymerization catalyst, a mixture of 0.028 g (0.07 mmol, 1: 200,000 mol/lactide mol) of Sn(Oct)$_2$ (Sigma-Aldrich, Mw=405.1 g/mol) and 2 g of carbodiimide (Reine Chem, stabaxol P) were injected using a reactor charge port. After completing injection of the materials, the reactor was heated by heating hot oil. When the reactor temperature reached 100~130° C., the reactor was stirred. Polymerization was performed within the reactor temperature of 160~190° C. until the reactor viscosity became constant. When the reactor viscosity reached a predetermined level, the stirring was stopped. Then, a bottom drain valve was opened to inject N$_2$ gas into the reactor, and a polylactide resin strand was finally obtained. The polymerization time was 4.4 hrs, and the resin had a conversion rate of 94.3%, and a weight average molecular weight of 154,800 g/mol.

Example 6

Organic Carbodiimide-Sn(Oct)$_2$ Complex/Lactide Ring Opening Polymerization (Polymerization Catalyst: Carbodiimide-Sn(Oct)$_2$=1: 100,000 Mol/Lactide Mol)

A polylactide resin was prepared in the same manner as in Example 1, except that 1.05 g (0.14 mmol, 1: 100,000 mol/lactide mol) of the organometallic complex of Chemical Formula 1 was used instead of the mixture of 0.056 g (0.14 mmol, 1: 100,000 mol/lactide mol) of Sn(Oct)$_2$ (Sigma-Aldrich, Mw=405.1 g/mol) and 1 g of carbodiimide (Reine Chem, stabaxol P) in Example 1.

[Chemical Formula 1]

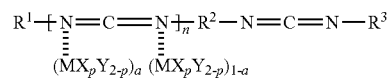

(wherein n is an integer of 0~15, p is 0, a is 1, M is Sn, each of R$^1$ and R$^3$ is a monovalent substituted benzene ring, R$^2$ is a bivalent substituted benzene ring, each of X and Y is a carboxyl group).

In this regard, the carbodiimide component is included in an amount of 0.1 wt % in the organometallic complex of Chemical Formula 1.

The polylactide resin prepared by the above method had a conversion rate of 96%, and a weight average molecular weight of 295,000 g/mol.

Experimental Example 1

Catalytic Activity

Table 1 shows the polymerization properties of the polylactide resins prepared in Comparative Examples 1~3 and Examples 1~6. The conversion rate of the resin was obtained by $^1$H NMR, and the molecular weight thereof was analyzed by GPC using chloroform. The Sn element content (mass ppm) was also measured by ICP element analysis. FIG. 1 is a graph showing the comparison of catalytic activity between Comparative Examples 1-3 and Examples 1-5 according to changes in Sn(Oct)$_2$ and carbodiimide contents.

TABLE 1

|  | Sn (mass ppm) | Carbodiimide (Stbaxol P, wt %) | Polymerization time (hr) | Conversion rate (%) | Molecular weight (g/mol) | Catalytic activity (kg · polymer/ g · cat × hr) |
|---|---|---|---|---|---|---|
| Comparative Example 1 | 21 | 0 | 3.3 | 96.0 | 177,500 | 4.1 |
| Comparative Example 2 | 14 | 0 | 4.7 | 96.1 | 168,500 | 4.4 |
| Comparative Example 3 | 4 | 0 | 8.0 | 94.5 | 151,900 | 8.0 |
| Example 1 | 8 | 0.05 | 4.2 | 96.3 | 178,000 | 8.2 |

TABLE 1-continued

|  | Sn (mass ppm) | Carbodiimide (Stbaxol P, wt %) | Polymerization time (hr) | Conversion rate (%) | Molecular weight (g/mol) | Catalytic activity (kg · polymer/ g · cat × hr) |
| --- | --- | --- | --- | --- | --- | --- |
| Example 2 | 4 | 0.05 | 5.0 | 95.6 | 164,500 | 13.7 |
| Example 3 | 8 | 0.1 | 4.3 | 96.2 | 188,050 | 10.4 |
| Example 4 | 6 | 0.1 | 3.8 | 95.8 | 214,370 | 13.6 |
| Example 5 | 4 | 0.1 | 4.4 | 94.3 | 191,580 | 15.3 |
| Example 6 | 6 | 0.1 | 4 | 96.0 | 295.000 | 12.5 |

Referring to Table 1 and FIG. 1, when the $Sn(Oct)_2$ single catalysts were used without carbodiimide as in Comparative Examples 1 to 3, the polymerization time was increased, as the content of the catalyst was decreased. That is, as the content of the catalyst was decreased, a longer time was required for polymerization until a predetermined torque is reached.

In contrast, the use of the organic carbodiimide-$Sn(Oct)_2$ complex catalysts of Examples 1 to 6 greatly reduced the polymerization time, compared to the use of the $Sn(Oct)_2$ single catalysts of Comparative Examples 1 to 3. That is, when carbodiimide of 0.05 wt % or 0.1 wt % was added, the polymerization time was reduced, compared to the use of the $Sn(Oct)_2$ single catalysts.

The catalytic activity of each catalyst was shown in Table 1. Herein, the catalytic activity was expressed as the weight (kg) of the polylactide resin obtained during a unit time period (hr) per the unit weight (g) of the $Sn(Oct)_2$ catalyst. As shown in Table 1, the use of organic carbodiimide-$Sn(Oct)_2$ complex catalyst greatly increased the catalytic activity.

In short, it can be seen that the polymerization activity of polylactide can be greatly increased by the use of organic carbodiimide-$Sn(Oct)_2$ complex catalyst.

In the use of organic carbodiimide-$Sn(Oct)_2$ complex catalyst, the increased polymerization activity in the lactide ring opening polymerization is the greatest advantage of the organic complex as a catalyst for polymerization of the polylactide resin. The previous literature (Zhang, X et al, Journal of Polymer Science, Part A: Polymer Chemistry. 1994, 32, 2965-2970) reported that the presence of an acidic group such as carboxylic acid in the lactide ring opening polymerization reduces the polymerization rate. Therefore, the increased polymerization activity by the use of the organic carbodiimide-$Sn(Oct)_2$ complex catalyst is attributed to the carbodiimide which was added as a component of the organic complex to function as a carboxylic acid scavenger in the polymerization solution, consequently leading to a great reduction in the acidity of the polymerization solution.

Experimental Example 2

Acidity

Figure 2:
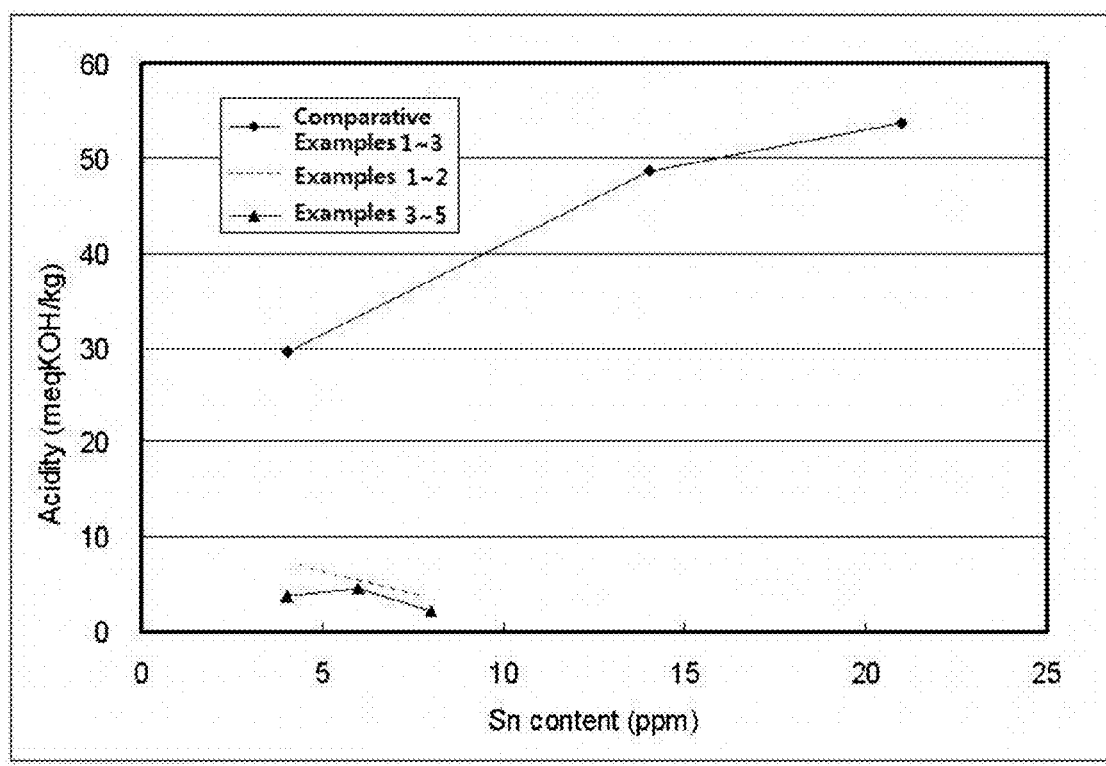
FIG. 2 is a graph showing the acidity of Comparative Examples 1 to 3 and Examples 1 to 5 according to their Sn contents.

The acidities of the polylactide resins of Comparative Examples and Examples were measured. The measurement of the acidity was conducted using phenolphthalein and a 0.1 N KOH ethanol solution as a titration solution. The results are shown in Table 2. FIG. 2 is a graph showing the acidities of Comparative Examples 1 to 3 and Examples 1 to 5 according to their Sn contents.

TABLE 2

|  | Sn (mass ppm) | Carbodiimide (Stbaxol P, wt %) | Acidity (meqKOH/kg · polymer) |
| --- | --- | --- | --- |
| Comparative Example 1 | 21 | 0 | 53.7 |
| Comparative Example 2 | 14 | 0 | 48.6 |
| Comparative Example 3 | 4 | 0 | 29.6 |
| Example 1 | 8 | 0.05 | 3.6 |
| Example 2 | 4 | 0.05 | 7.3 |
| Example 3 | 8 | 0.1 | 2.1 |
| Example 4 | 6 | 0.1 | 4.5 |
| Example 5 | 4 | 0.1 | 3.7 |

Referring to Table 2, it was found that when the $Sn(Oct)_2$ single catalysts were used as in Comparative Examples 1 to 3, the acidity was reduced to 53.7, 48.6, and 29.6, as the content of the catalyst was decreased to 21 ppm, 14 ppm, and 4 ppm, respectively. These results ascertain that because the $Sn(Oct)_2$ catalyst has an acidity of approximately 5%, that is, it contains octanoic acid, the decreased content of the catalyst leads to the decrease in the content of octanoic acid in the polymerization solution.

In contrast, the use of the organic carbodiimide-$Sn(Oct)_2$ complex of Examples greatly reduced the acidity of the polylactide resin within the range of 2.1~7.3 meqKOH/kg, compared to the use of the equivalent amount of $Sn(Oct)_2$ of Comparative Examples.

As such, the carbodiimide of the organic carbodiimide-$Sn(Oct)_2$ catalyst complex added during the polymerization of the polylactide resin functions as an acid scavenger for acidic groups in the polymerization solution, that is, for octanoic acid derived from $Sn(Oct)_2$ or carboxylic acid at the chain end of the polylactide molecule, thereby greatly reducing the acidity of the resin. Considering that the acidic groups such as carboxylic acid function to catalyze hydrolysis and thermal decomposition of the polylactide resin, it is expected that the polylactide resin having a low acidity prepared by using the organic carbodiimide-$Sn(Oct)_2$ complex catalyst shows excellent heat resistance and hydrolysis resistance.

Experimental Example 3

Color

Japanese Patent Publication No. 2008-248162 discloses that after polymerization, the polylactide resin is kneaded with carbodiimide to reduce the acidity of polylactide resin, thereby improving its hydrolysis resistance. However, this method has a problem that the polylactide resin turns yellowish after kneading due to the use of chromophore-containing carbodiimide, which has limited the addition amount of carbodiimide. When the polylactide resin is prepared using the organic carbodiimide-$Sn(Oct)_2$ complex as proposed in the present invention, the above mentioned discoloration of the resin may also occur. However, in the present invention, the color of the resin can be greatly improved by reducing the content of Sn(Oct)$_2$.

Figure 3:
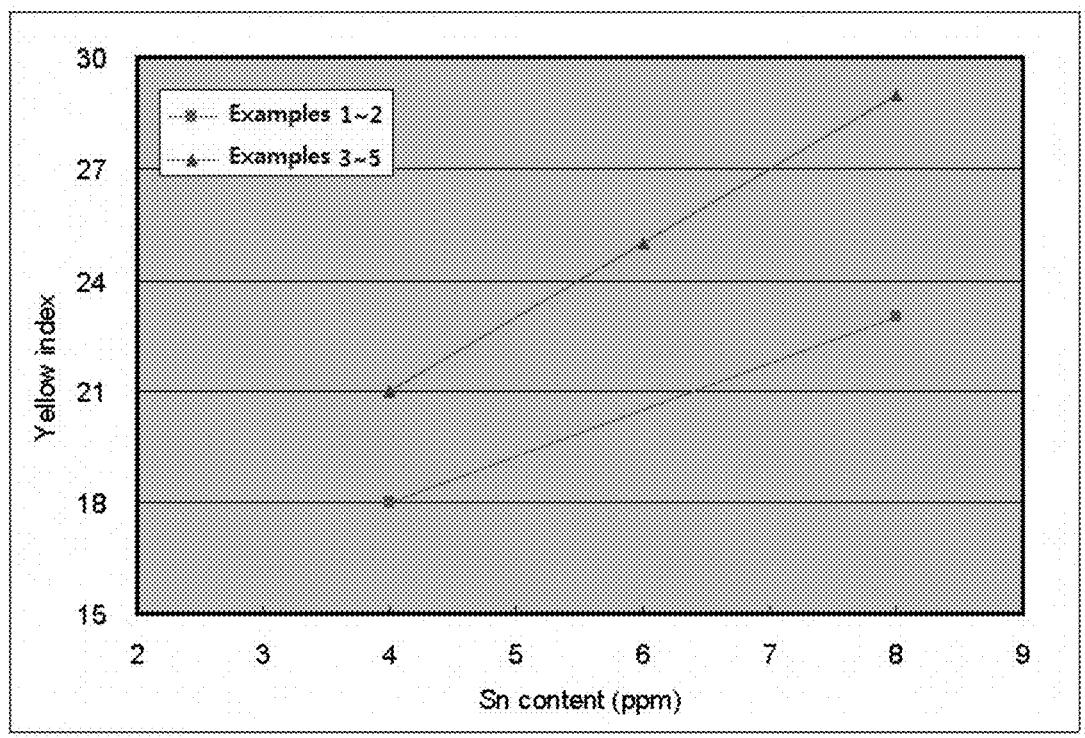
FIG. 3 is a graph showing the yellow index (YI) of Examples 1 to 5 according to their Sn contents.

In order to confirm this, yellow index of the polylactide resins prepared in Examples 1 to 5 was measured. YI measurement was performed using COLORFLEX1200, and the results are shown in Table 3. FIG. 3 shows the yellow index (YI) of Examples 1 to 5 according to their Sn contents.

TABLE 3

|  | Sn (mass ppm) | Carbodiimide (Stbaxol P, wt %) | YI (Yellow Index) |
|---|---|---|---|
| Example 1 | 8 | 0.05 | 23 |
| Example 2 | 4 | 0.05 | 18 |
| Example 3 | 8 | 0.1 | 29 |
| Example 4 | 6 | 0.1 | 25 |
| Example 5 | 4 | 0.1 | 21 |

Referring to Table 3 and FIG. 3, as the carbodiimide content increased, YI increased in all Examples. However, when the organic carbodiimide-Sn(Oct)$_2$ complex catalyst was used, YI was greatly reduced by reducing the content of Sn catalyst to 4 ppm (Example 5). In other words, it revealed that the Sn catalyst is an important factor in discoloration of the polylactide resin.

As mentioned above, carbodiimide is a compound widely used for hydrolysis resistance in the polyester resin compounding and processing. However, because carbodiimide contains chromophore, it causes discoloration of the polyester resin, which limits the usage thereof. In addition, the major cause of the polyester resin discoloration is the Sn metal of the Sn(Oct)$_2$ catalyst, or the metal impurity that is included in an additive or impurities.

As described in the present invention, when the organic carbodiimide-Sn(Oct)$_2$ complex is added during lactide ring opening polymerization, the content of the Sn catalyst can be reduced to 4 ppm owing to its high polymerization activity. Therefore, even though the catalyst includes the carbodiimide compound in a predetermined amount or more, the color of the polylactide resin can be greatly improved. Also, the colors of the polylactide resins of Examples of the present invention can be further improved by adding an additive such as antioxidant during the polylactide processing.

Experimental Example 4

Heat Resistance—Molecular Weight Degradation Rate

Heat resistance of the polylactide resin prepared by using the organic carbodiimide-Sn(Oct)$_2$ complex was evaluated.

Figure 4:
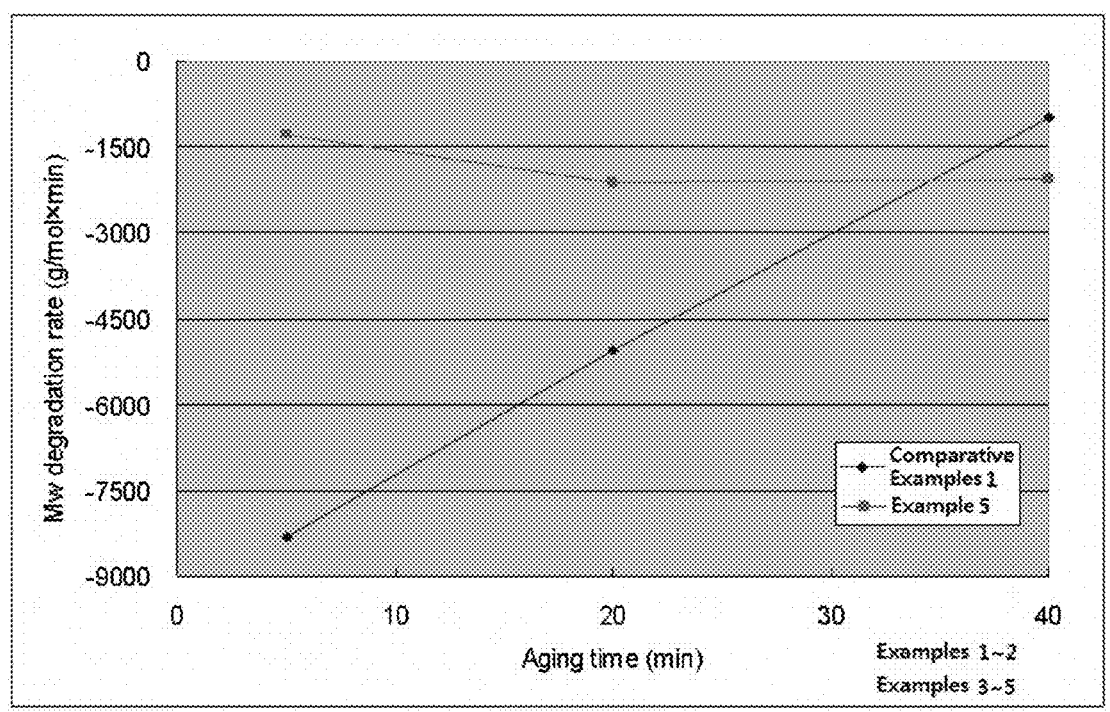
FIG. 4 is a graph showing the mass-loss rate of Comparative Example 1 and Example 5.

Specifically, the polylactide resin of Example 5 which was prepared by using 4 ppm of the Sn catalyst with 0.1 wt % of carbodiimide was used in order to examine the effect of the reduced content of the Sn catalyst on heat resistance. The Sn resin of Comparative Example 1 was used in order to examine the effect of carbodiimide. For measurement of heat resistance, 4 g of each resin was put into an MI (melt index) tester heated to 220°, and left for 0 minute, 5 minutes, 20 minutes, and 40 minutes for thermal decomposition, and then the weight average molecular weight of each sample was measured. The results are shown in Table 4. In Table 4, Relative Mw is a ratio obtained by dividing the weight average molecular weight by the initial weight average molecular weight (aging time=0 min), and Mw degradation rate represents a rate of molecular weight reduction (g/mol×min) at each section. FIG. 4 is a graph showing the weight-loss rate of Comparative Example 1 and Example 5.

TABLE 4

|  | Aging time (min) | Mw (g/mol) | Mw/Mn | Relative Mw (Mw(t)/Mw(0)) | Mw degradation rate (g/mol × min) |
|---|---|---|---|---|---|
| Comparative Example 1 | 0 | 182,900 | 1.96 | 1 |  |
|  | 5 | 146,100 | 2.03 | 0.80 | −8315 |
|  | 20 | 120,300 | 1.76 | 0.66 | −5056 |
|  | 40 | 84900 | 1.97 | 0.46 | −1002 |
| Example 5 | 0 | 188,700 | 1.62 | 1 |  |
|  | 5 | 182,300 | 1.62 | 0.97 | −1277 |
|  | 20 | 150,300 | 1.54 | 0.80 | −2133 |
|  | 40 | 109,300 | 1.79 | 0.58 | −2050 |

Referring to Table 4 and FIG. 4, the rate of molecular weight reduction due to thermal decomposition was greatly reduced in the resin of Example 5 which was polymerized by using the organic carbodiimide-Sn(Oct)$_2$ complex, compared to the resin of Comparative Example 1 which was polymerized by using the Sn(Oct)$_2$ single catalyst. In other words, the resin polymerized by using the organic carbodiimide-Sn (Oct)$_2$ complex showed a remarkably excellent molecular weight degradation rate during 0~40 min.

Even though the resin of Comparative Example 1 showed a low Mw degradation rate at 40 min, its average degradation rate during 0~40 min is much higher than that of Example. Thus, the resin of Comparative Example 1 is not preferred.

Importantly, the resin of Example 5 showed a low average degradation rate of −2500 g/mol or less during 0~40 min. Therefore, when the content of the Sn catalyst in the organic carbodiimide-Sn(Oct)$_2$ complex is reduced to 4 ppm (Example 5), the prepared polylactide resin showed much lower Mw degradation rate.

These results demonstrated that the polylactide resin prepared by using the organic carbodiimide-Sn(Oct)$_2$ complex with a low Sn content showed superior heat resistance.

Experimental Example 5

Heat Resistance—Mass Loss Rate

Thermal gravimetric analysis (TGA) was carried out in order to test heat resistance of the resin. The experiment was carried out using an Advanced instrument TGA, and the mass loss rates of the polylactide resins were compared during isothermal heating under N$_2$ condition at 260° C. for 30 min. In order to remove the effect of the residual monomers, the pellet obtained after polymerization was precipitated in chloroform/methanol to remove the residual monomers, and the powdery sample obtained after precipitation was dried in a vacuum oven for 24 hrs, and then used in the experiment.

Generally, a mass loss rate of a polymer resin during isothermal heating in TGA is linear with time, as in Equation 1.

$$m(t)=m(o)-kt \qquad \text{[Equation 1]}$$

wherein m(o) represents the mass of the initial polymer sample, polylactide resin, m(t) represents the mass of the polymer sample, polylactide resin at the isothermal heating time (t), t represents time, and k represent a rate constant.

In this regard, the mass means the pure mass of the polylactide resin under each condition.

In Equation, the small rate constant k means the low rate of mass loss due to heat decomposition, indicating excellent heat resistance.

Figure 5:
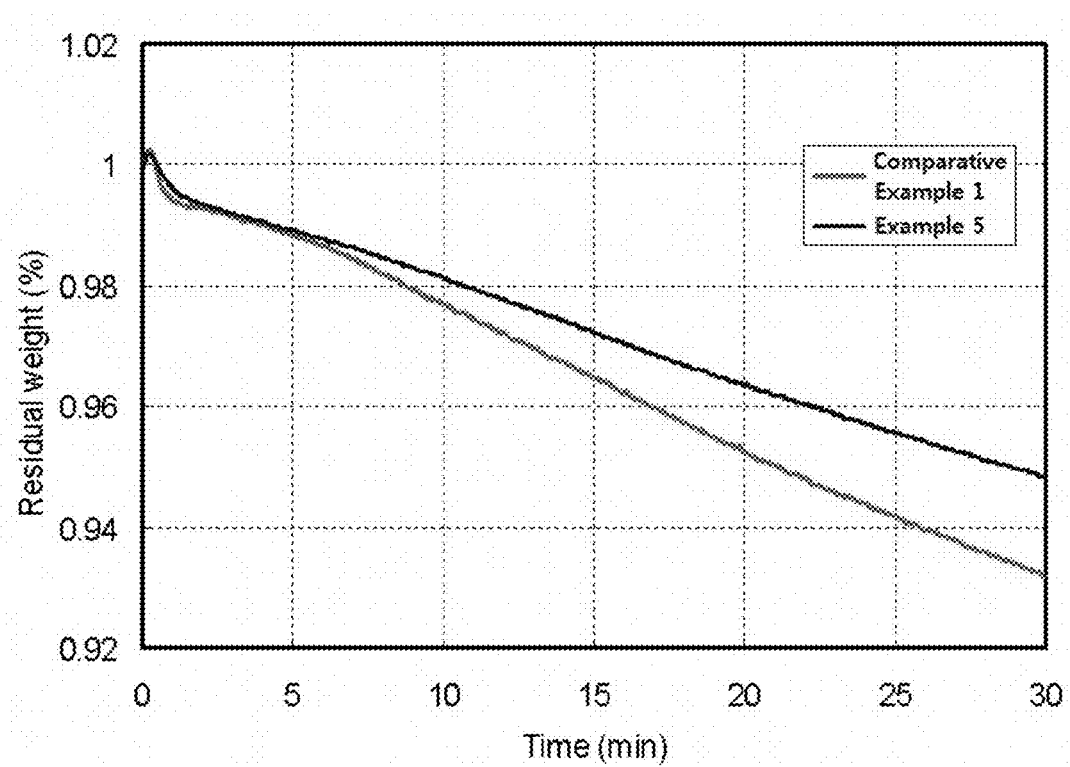
FIG. 5 is an isothermal TGA decomposition curve of Comparative Example 1 and Example 5.

FIG. 5 is an isothermal TGA decomposition curve of Comparative Example 1 and Example 5. The mass loss rate constant k of Equation 1 can be obtained from the slope of the curve. The results at each time interval are shown in Table 5.

TABLE 5

|  | Mass-loss rate constant, k (mass %/hr) | | |
| --- | --- | --- | --- |
| Interval (min) | 0~30 | 0~10 | 10~30 |
| Comparative Example 1 | 13.7 | 12.2 | 13.6 |
| Example 5 | 9.9 | 10.3 | 9.9 |

Referring to Table 5, Example 5 using the organic carbodiimide-Sn(Oct)$_2$ complex catalyst with the Sn content of 4 ppm showed small values, compared to Comparative Example 1, indicating that the polylactide resin of the present invention has superior heat resistance.

In short, the polylactide resin prepared by using the organic carbodiimide-Sn(Oct)$_2$ complex catalyst showed a reduction in the molecular weight loss due to thermal decomposition at high temperature and a low mass loss rate, compared to that prepared by using the Sn(Oct)$_2$ single catalyst, indicating improved heat resistance. In addition, when the Sn content in the organic carbodiimide-Sn(Oct)$_2$ complex catalyst is reduced to 4 ppm, the prepared polylactide resin showed more excellent heat resistance.

Experimental Example 6

Lactide Monomer Depolymerization Rate

Heat resistance and mechanical properties of the polylactide resin are greatly affected by the residual monomers remaining in the resin. In other words, the residual monomers remaining in the resin are in contact with moisture during or after polymerization to be easily hydrolyzed into lactic acid, which facilitates heat decomposition of the resin. Therefore, it is important to reduce the content of the residual monomers in the preparation of polylactide resin. In order to prevent heat decomposition due to the residual monomers, the content is preferably reduced to less than 0.5%, and more preferably less than 0.2%.

Meanwhile, the lactide ring opening polymerization is a typical equilibrium reaction between a monomer and a polymer, and a forward reaction is a propagation reaction of linking the monomer to the polymer and a reverse reaction is a depolymerization reaction of generating a lactide monomer at the end of the polymer. The polymerization catalyst, Sn catalyst is known to function as a catalyst in the propagation of polylactide as well as in the depolymerization of generating lactide monomers. In order to prevent the lactide monomer depolymerization by the Sn catalyst, an additive such as a metal deactivator (MD) capable of eliminating the catalytic activity is commonly added after completion of the polymerization. In addition, a mechanism of the depolymerization shows that the terminal hydroxyl group (—OH) of the polylactide resin attacks the neighboring carbonyl group (—COOH).

As described above, when the organic carbodiimide-Sn (Oct)$_2$ complex is used as a catalyst, carbodiimide reacts with the terminal hydroxyl group (—OH) of the polylactide resin that is growing by the polymerization, so as to reduce the concentration of the hydroxyl group in the polymerization system. Therefore, it is expected that a polylactide resin having greatly inhibited monomer depolymerization can be obtained.

In order to confirm this, differences in monomer depolymerization rates between the resin polymerized by the organic carbodiimide-Sn(Oct)$_2$ complex, the resin polymerized by the Sn(Oct)$_2$ single catalyst, and NatureWorks 4032D were examined.

The resins of Comparative Example 1 and Example 5 were used as samples in the experiment, and precipitated in chloroform/methanol in order to remove the residual monomers, and then sufficiently dried in a 50° C. vacuum oven before use.

Hereinbelow, the experimental method of depolymerization will be described in detail.

Figure 6:
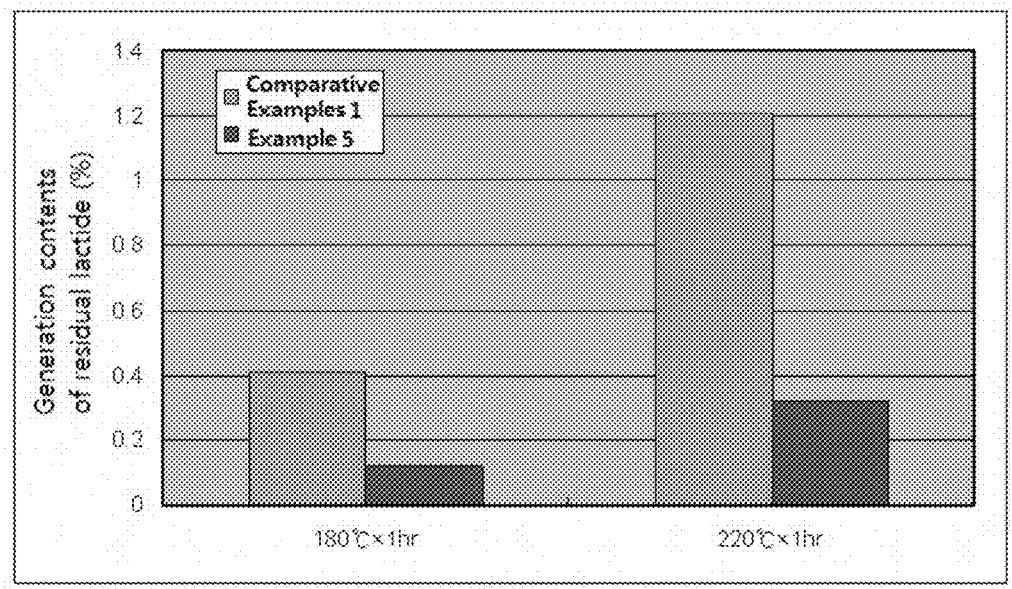
FIG. 6 is a graph showing lactide generation of Comparative Example 1 and Example 5 after heat treatment at each temperature for 1 hour.

20~50 mg of the sample was mixed well with 40 ml of chloroform by stirring for 24 hours, and then the mixture was put in an aluminum dish, and left in a 30° C. vacuum oven for 4 hours for complete removal of the chloroform solvent so as to obtain a polymer film. Each polymer film was put in an NMR test tube, and a plastic cap was put thereon. Then, the cap was sealed with parafilm so as to prevent leakage of the lactide out of the test tube. The sealed NMR test tube was dipped in a hot oil bath that was heated to a predetermined temperature. At this time, take note that the bottom of the test tube where the sample was placed should be immersed in the hot oil. The experiment was performed in the hot oil bath under two temperature conditions of 180° C. and 220° C., and the NMR test tube was taken out of the hot oil bath at 1 hr after dipping, and cooled in ice water. After sufficient cooling, 2 ml of CDCl$_3$ was injected to the NMR test tube, and capped, and dissolved by stirring for 24 hrs. At this time, the NMR test tube was shaken by hand to dissolve the lactide adhering to the wall of the test tube in CDCl$_3$. Thereafter, the content of the residual lactide was measured using $^1$H NMR. The results are shown in Table 6. In Table 6, the amount of the residual lactide generated was obtained by subtracting the initial content of residual lactide after precipitation from the content of residual lactide after heating in the oil bath for 1 hr. The results are shown in Table 6. FIG. 6 is a graph showing lactide generation of Comparative Example 1 and Example 5 after heat treatment at each temperature for 1 hour.

TABLE 6

|  | Initial content of residual lactide after precipitation (%) | Amount of residual lactide generated after aging in oil bath (%) | |
| --- | --- | --- | --- |
|  |  | 180° C. × 1 hr | 220° C. × 1 hr |
| Comparative Example 1 | 0.10 | 0.41 | 1.21 |
| Example 5 | 0.51 | 0.12 | 0.32 |

Referring to Table 6 and FIG. 6, in both Comparative Example 1 and Example 5, the contents of residual lactide were increased, as the temperature of hot oil increased. These results indicate that monomer depolymerization or decomposition occurs more rapidly when the temperature was increased from 180° C. to 220° C. When the amounts of residual lactide generated at the same temperature were compared, Example 5 showed a much lower content than Comparative Example 1, and the difference in the residual monomer content between two samples began to increase as the temperature of hot oil was increased to 220° C. In other words, the content of residual lactide in Example 5 (0.32%) was lower than that in Comparative Example 1 (1.21%). These results indicate that the resin polymerized by the organic carbodiimide-Sn(Oct)$_2$ complex of Example 5 has a low rate of resin decomposition due to monomer depolymerization, compared to the resin polymerized by the Sn(Oct)$_2$ single catalyst of Comparative Example 1.

In short, the polylactide resin polymerized by the organic carbodiimide-Sn(Oct)$_2$ complex is a resin having greatly inhibited monomer depolymerization, compared to the resin polymerized by the Sn(Oct)$_2$ single catalyst. In addition, this resin showed excellent depolymerization stability without using any metal deactivator (MD). Specifically, the monomer depolymerization-inhibited resin showed a very low content (less than 0.5%) of lactide generated for 1 hr at 220° C. even though MD was not used. Therefore, the polylactide resin polymerized by the organic carbodiimide-Sn(Oct)$_2$ complex shows superior heat resistance and low monomer depolymerization or decomposition in the high-temperature processing after polymerization, compared to the polylactide resin polymerized by the Sn(Oct)$_2$ single catalyst, and thus it is expected to maintain excellent mechanical properties.

Experimental Example 7

Hydrolysis Resistance Property

Changes in the molecular weight and tensile strength after hydrolysis were measured with respect to Comparative Example 1 and Examples 3 and 5. The polymerized resins were precipitated in chloroform/methanol, and then dried in a vacuum oven to obtain powder. The specimens for tensile strength test were prepared in a dog bone type by injection at 200° C. The specimens prepared were aged in an autoclave at a temperature of 121° C. and at a relative humidity of 100% for 20 min, 40 min, and 60 min, and then GPC molecular weight and tensile strength of each sample were tested.

Figure 7:
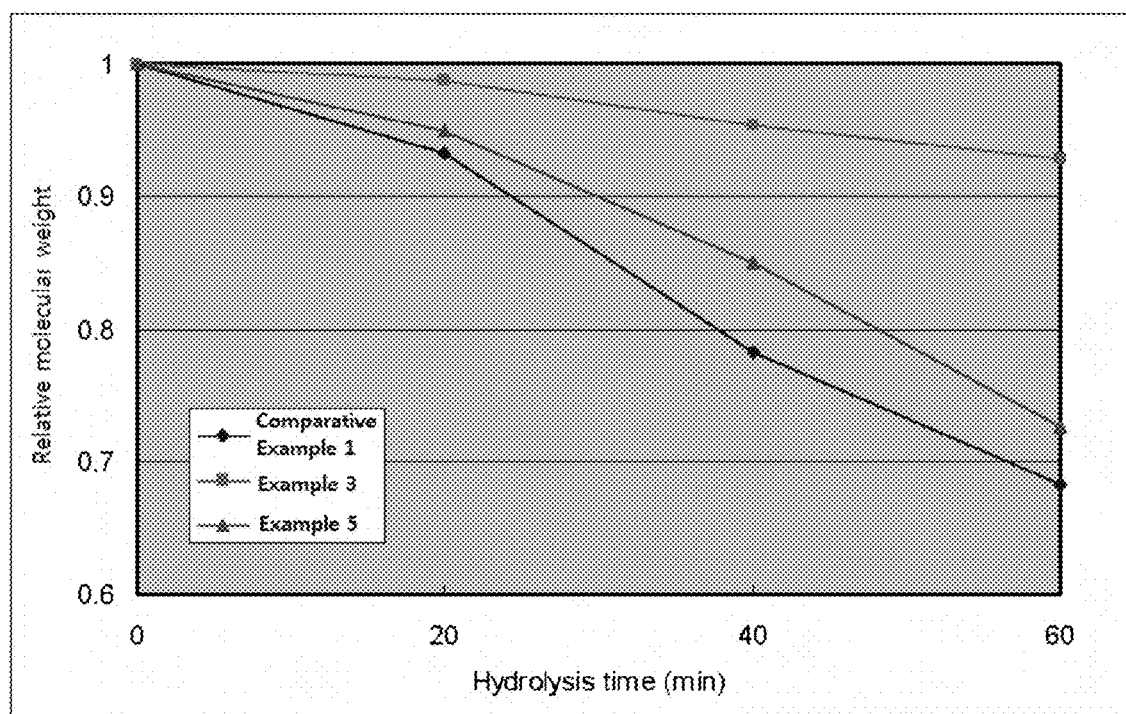
FIG. 7 shows the comparison of hydrolysis resistance between Comparative Example 1 and Examples 3 and 5.

Table 7 shows a relative molecular weight which is represented by a ratio of the initial molecular weight (hydrolysis time=0) of the sample to the molecular weight of the sample after hydrolysis. FIG. 7 shows comparison of hydrolysis resistance between Comparative Example 1 and Examples 3 and 5.

TABLE 7

|  | Hydrolysis time (min) (Temperature 121° C./ relative humidity 100%) | Relative molecular weight |
| --- | --- | --- |
| Comparative Example 1 | 0 | 1 |
|  | 20 | 0.932 |
|  | 40 | 0.782 |
|  | 60 | 0.683 |
| Example 3 | 0 | 1 |
|  | 20 | 0.988 |
|  | 40 | 0.9544 |
|  | 60 | 0.928 |
| Example 5 | 0 | 1 |
|  | 20 | 0.949 |
|  | 40 | 0.850 |
|  | 60 | 0.726 |

As in the results of Table 7, the resins polymerized by the organic carbodiimide-Sn(Oct)$_2$ complex of Examples 3 and 5 showed high molecular weight maintenance ratio after hydrolysis, and in particular, Example 3 showed the highest value.

Figure 8:
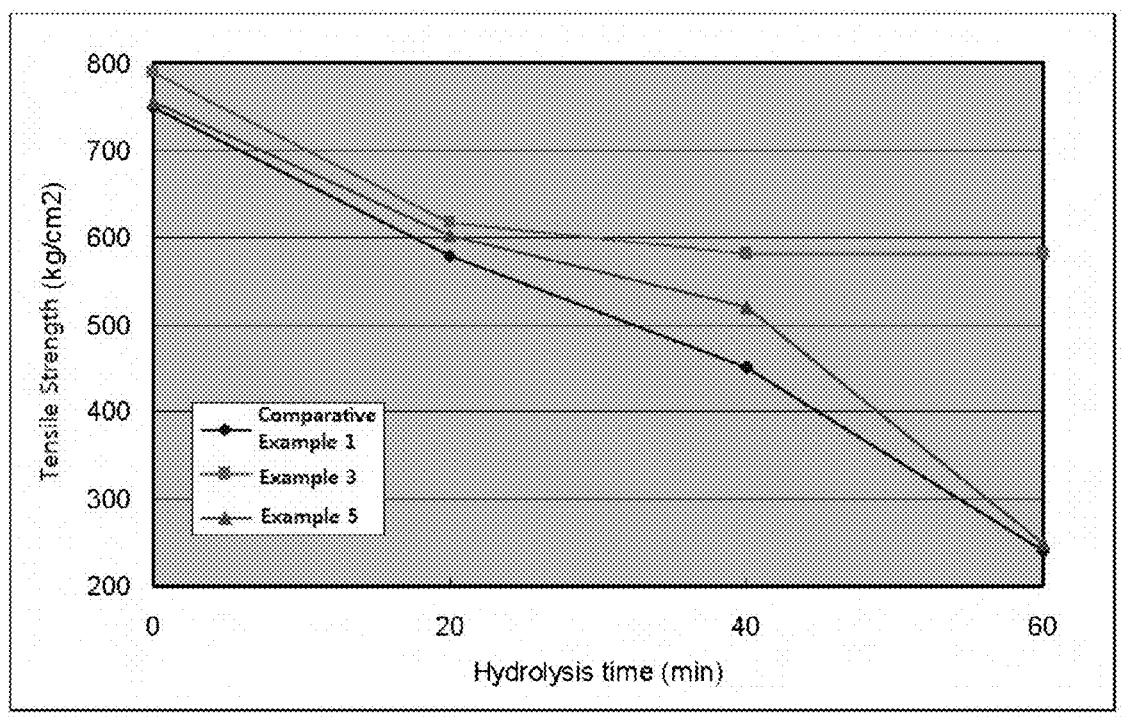
FIG. 8 is the results of measuring tensile strength of Comparative Example 1 and Examples 3 and 5 after hydrolysis.

Table 8 shows the result of measuring tensile strength of Comparative Example 1 and Examples 3 and 5 after hydrolysis, and FIG. 8 shows a graph thereof.

TABLE 8

|  | Hydrolysis time (min) (temperature 121° C./ relative humidity 100%) | Tensile strength (kg/cm$^2$) |
| --- | --- | --- |
| Comparative Example 1 | 0 | 750 |
|  | 20 | 580 |
|  | 40 | 450 |
|  | 60 | 239 |
| Example 3 | 0 | 789 |
|  | 20 | 616 |
|  | 40 | 582 |
|  | 60 | 581 |
| Example 5 | 0 | 755 |
|  | 20 | 603 |
|  | 40 | 519 |
|  | 60 | 248 |

As shown in Table, 8, the resin polymerized by the organic carbodiimide-Sn(Oct)$_2$ complex of Examples 3 and 5 showed excellent strength, compared to the resin polymerized by the Sn(Oct)$_2$ single catalyst of Comparative Example 1.

The invention claimed is:

1. A preparation method of the polylactide resin, comprising the step of
carrying out ring opening polymerization with lactide monomers in the presence of an organometallic complex catalyst of the following Chemical Formula 1,
wherein the organometallic complex has 10 or higher of a catalytic activity represented by the following Equation 2:

[Chemical Formula 1]

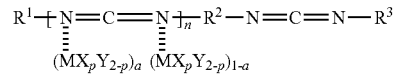

Catalytic activity=kg(polymer)/g(cat)·hr    [Equation 2]

wherein n is an integer of 0~15, p is an integer of 0~2, M is Sn, $R^1$ and $R^3$ are the same as or different from each other, and each of them is hydrogen, substituted or unsubstituted C3 to C10 alkyl, substituted or unsubstituted C3 to C10 cycloalkyl, or substituted or unsubstituted C6 to C10 aryl, $R^2$ is substituted or unsubstituted C3 to C10 alkylene, substituted or unsubstituted C3 to C10 cycloalkylene, or substituted or unsubstituted C6 to C10 arylene, and each of X and Y is independently an alkoxy group or a carboxyl group.

2. The preparation method according to claim 1, wherein the compound of Chemical Formula 3 is added in the polymerization catalyst at a ratio of 1:200,000~1:100,000 (mole/mole ratio) with respect to the lactide monomers.

3. The preparation method according to claim 1, wherein $MX_pY_{2-p}$ is tin(II) 2-ethylhexanoate (Sn(Oct)$_2$).

4. The preparation method according to claim 1, wherein the carbodiimide component of Chemical Formula 2 is included in the polymerization catalyst in an amount of less than 0.1% by weight.

5. The preparation method according to claim 1, wherein the polymerization catalyst is an organic carbodiimide-Sn(Oct)$_2$ complex including the Sn catalyst in an amount of 4~50 ppm.

6. The preparation method according to claim 1, wherein the polymerization catalyst is an organic carbodiimide-Sn(Oct)$_2$ complex including the Sn catalyst in an amount of less than 4 to 6 ppm.

7. The preparation method according to claim 1, wherein the ring opening polymerization is carried out at a temperature of 120 to 200° C. for 0.5 to 8 hours.

8. A preparation method of the polylactide resin, comprising the step of
carrying out ring opening polymerization with lactide monomers in the presence of a polymerization catalyst including a mixture of compounds of the following Chemical Formulae 2 and 3,
wherein the compounds of the Chemical Formulae 2 and 3 have 10 or higher of a catalytic activity represented by the following Equation 2:

[Chemical Formula 2]

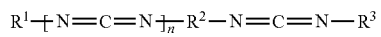

[Chemical Formula 3]

[Equation 2]
Catalytic activity = kg(polymer)/g(cat) · hr wherein, n is an integer of 0~15, M is Sn, $R^1$ and $R^3$ are the same as or different from each other, and each of them is hydrogen, substituted or unsubstituted C3 to C10 alkyl, substituted or unsubstituted C3 to C10 cycloalkyl, or substituted or unsubstituted C6 to C10 aryl, $R^2$ is substituted or unsubstituted C3 to C10 alkylene, substituted or unsubstituted C3 to C10 cycloalkylene, or substituted or unsubstituted C6 to C10 arylene, and each of X and Y is independently an alkoxy group or a carboxyl group.

9. The preparation method according to claim 8, wherein the compound of Chemical Formula 3 is added in the polymerization catalyst at a ratio of 1:200,000~1:100,000 (mole/mole ratio) with respect to the lactide monomers.

10. The preparation method according to claim 8, wherein $MX_pY_{2-p}$ is tin(II) 2-ethylhexanoate ($Sn(Oct)_2$).

11. The preparation method according to claim 8, wherein the carbodiimide component of Chemical Formula 2 is included in the polymerization catalyst in an amount of less than 0.1% by weight.

12. The preparation method according to claim 8, wherein the polymerization catalyst is an organic carbodiimide-Sn(Oct)$_2$ complex including the Sn catalyst in an amount of 4~50 ppm.

13. The preparation method according to claim 8, wherein the polymerization catalyst is an organic carbodiimide-Sn(Oct)$_2$ complex including the Sn catalyst in an amount of less than 4 to 6 ppm.

14. The preparation method according to claim 8, wherein the ring opening polymerization is carried out at a temperature of 120 to 200° C. for 0.5 to 8 hours.

* * * * *